US012647804B2

(12) United States Patent (10) Patent No.: US 12,647,804 B2
Si et al. (45) Date of Patent: Jun. 2, 2026

(54) SIGNAL MEASUREMENT METHOD, MEASUREMENT GAP CONFIGURATION METHOD, TERMINAL, AND NETWORK DEVICE

(71) Applicant: VIVO MOBILE COMMUNICATION CO., LTD., Dongguan (CN)

(72) Inventors: Ye Si, Dongguan (CN); Huaming Wu, Dongguan (CN); Yuanyuan Wang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 288 days.

(21) Appl. No.: 17/957,620

(22) Filed: Sep. 30, 2022

(65) Prior Publication Data

US 2023/0038050 A1 Feb. 9, 2023

Related U.S. Application Data

(63) Continuation of application No. PCT/CN2021/084440, filed on Mar. 31, 2021.

(30) Foreign Application Priority Data

Apr. 3, 2020 (CN) .......................... 202010258720.3

(51) Int. Cl.
*H04W 24/08* (2009.01)
*H04W 24/10* (2009.01)
(52) U.S. Cl.
CPC ........... *H04W 24/08* (2013.01); *H04W 24/10* (2013.01)

(58) Field of Classification Search
CPC ..... H04W 24/08; H04W 24/10; H04W 24/04; H04W 36/0088; H04W 64/00;
(Continued)

(56) References Cited

U.S. PATENT DOCUMENTS 11,212,690 B2 12/2021 Liu et al.
2008/0189970 A1 8/2008 Wang et al.
(Continued)

FOREIGN PATENT DOCUMENTS

CN 106416350 A 2/2017
CN 109803303 A 5/2019
(Continued)

OTHER PUBLICATIONS

Extended European Search Report regarding European Patent Application No. 21778857.9, dated Jul. 10, 2023.
(Continued)

*Primary Examiner* — Yemane Mesfin
*Assistant Examiner* — Guoxing Fan
(74) *Attorney, Agent, or Firm* — Harness, Dickey & Pierce, P.L.C.

(57) ABSTRACT
A signal measurement method includes: obtaining measurement gap configuration information, where the measurement gap configuration information includes at least one of first measurement gap configuration information or second measurement gap configuration information, and gap pattern configuration information indicated by the second measurement gap configuration information is different from gap pattern configuration information indicated by the first measurement gap configuration information; and performing signal measurement within a measurement gap according to the measurement gap configuration information.

10 Claims, 5 Drawing Sheets

(58) Field of Classification Search
CPC ... H04W 76/28; H04W 8/24; H04W 72/0453;
H04W 72/231; H04W 72/232; Y02D
30/70; H04L 5/0048; H04L 27/26025
See application file for complete search history.

(56) References Cited

U.S. PATENT DOCUMENTS

| | | | |
|---|---|---|---|
| 2014/0274160 A1* | 9/2014 | Xiao | H04W 64/00 |
| | | | 455/456.1 |
| 2015/0245235 A1 | 8/2015 | Tang et al. | |
| 2019/0174341 A1* | 6/2019 | Chincholi | H04B 17/336 |
| 2020/0028648 A1* | 1/2020 | Akkarakaran | G01S 1/042 |
| 2020/0100131 A1* | 3/2020 | Yang | H04W 36/0088 |
| 2021/0058891 A1* | 2/2021 | Huang | H04W 64/00 |
| 2021/0297867 A1* | 9/2021 | Niu | H04L 27/0006 |
| 2021/0368374 A1* | 11/2021 | Cheng | H04W 72/542 |
| 2022/0131727 A1* | 4/2022 | Khoryaev | H04L 27/261 |
| 2023/0026600 A1* | 1/2023 | Xie | H04W 56/001 |

FOREIGN PATENT DOCUMENTS

| | | | |
|---|---|---|---|
| EP | 2666319 A1 | 11/2013 | |
| WO | WO-2018174804 A1 | 9/2018 | |
| WO | WO-2019014850 A1 | 1/2019 | |
| WO | WO-2020083121 A1 | 4/2020 | |

OTHER PUBLICATIONS

International Search Report and Written Opinion of the International Searching Authority regarding International Patent Application No. PCT/CN2021/084440, dated Jun. 21, 2021. Translation provided by Bohui Intellectual Property.

* cited by examiner

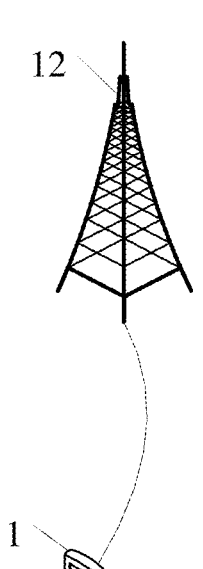

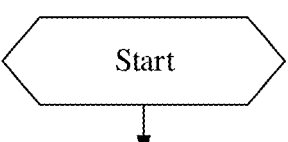

Start

Obtain measurement gap configuration information, where the measurement gap configuration information includes at least one of first measurement gap configuration information and second measurement gap configuration information, and gap pattern configuration information indicated by the second measurement gap configuration information is different from gap pattern configuration information indicated by the first measurement gap configuration information

201

Perform signal measurement within a measurement gap according to the measurement gap configuration information

202

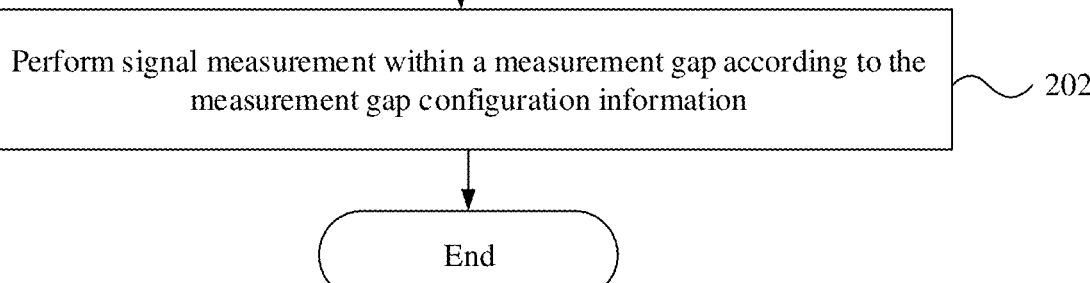

End

FIG. 2

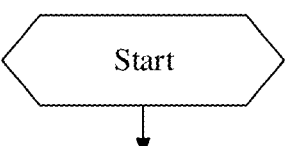

Send measurement gap configuration information to a terminal, where the measurement gap configuration information includes at least one of first measurement gap configuration information and second measurement gap configuration information, and gap mode configuration information indicated by the second measurement gap configuration information is different from gap pattern configuration information indicated by the first measurement gap configuration information

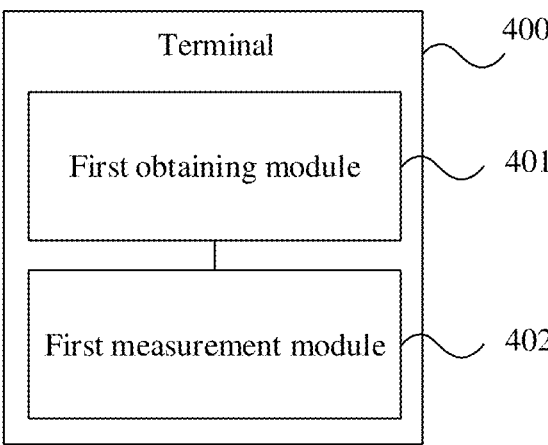

Terminal    400

First obtaining module    401

First measurement module    402

| Radio frequency unit | Network module |
|---|---|

512 510 520

530

Power supply 511

Audio output unit

590

Memory

Application program

Operating system

540

Input unit

Graphics processing unit 541

Microphone 542

580

Processor

Interface unit

Sensor 550

570

User input unit 571

Touch panel

Other input devices

Display unit 560

Display panel

572

561

Network device 600

First sending module 601

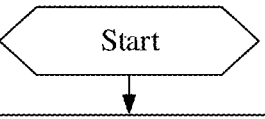

Determine or report cause information of a signal measurement failure based on at least one of information about a relationship between discontinuous reception DRX states and sounding reference signal SRS transmission, DRX configuration information, and SRS configuration information ⟶ 701

End

FIG. 7

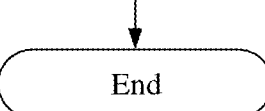

Receive cause information of a signal measurement failure sent by a network device ⟶ 801

Based on the cause information of the signal measurement failure, determine a measurement failure cause or determine location request information ⟶ 802

End

FIG. 8

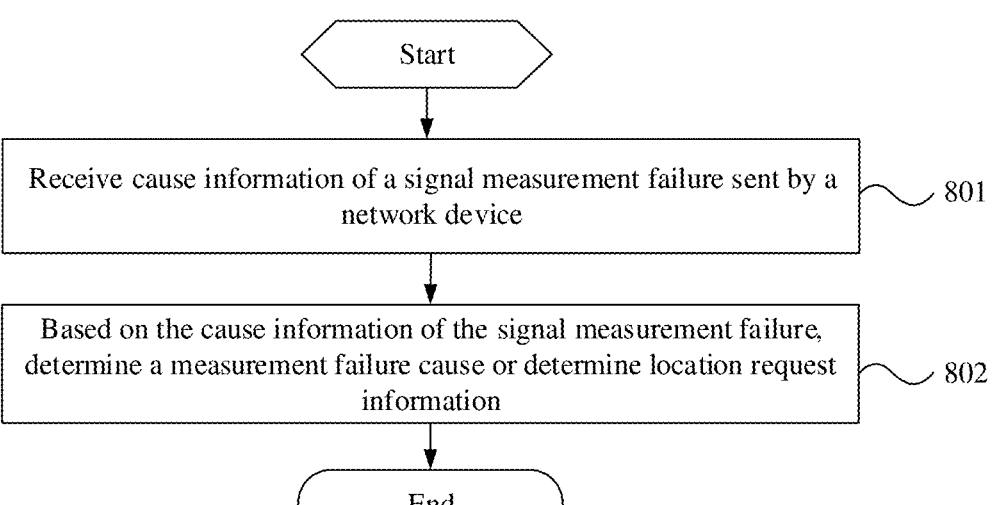

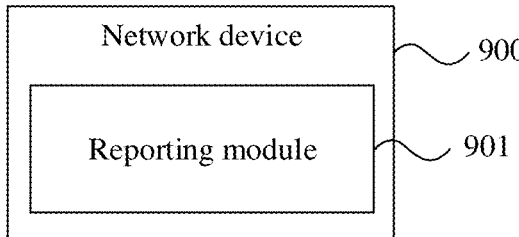

| Network device | 900 |
| Reporting module | 901 |

FIG. 9

SIGNAL MEASUREMENT METHOD, MEASUREMENT GAP CONFIGURATION METHOD, TERMINAL, AND NETWORK DEVICE

CROSS-REFERENCE TO RELATED APPLICATIONS

This application is a Bypass Continuation Application of PCT/CN2021/084440, filed on Mar. 31, 2021, which claims priority to Chinese Patent Application No. 202010258720.3, filed on Apr. 3, 2020, which are incorporated herein by reference in their entirety.

TECHNICAL FIELD

The present disclosure relates to the field of communications technologies, in particular to a signal measurement method, a measurement gap configuration method, a measurement reporting method, a terminal, a network device, and a location management device.

BACKGROUND

In the related art, a maximum length of a measurement gap is 6 ms, and considering a switching time of the measurement gap, user equipment (UE, also referred to as terminal) may actually perform signal measurement in about 5 ms. For positioning in new radio (NR), the measurement gap is used for measuring positioning reference signals (PRS) in many cases. However, consecutive PRSs (for example, repeated PRSs or a plurality of PRS resources are configured) of more than 5 ms are allowed to be configured in PRS configuration, and therefore measurement gap configuration may not match PRS configurations. The existing measurement gap configuration will limit PRS measurement by UEs.

SUMMARY

Embodiments of the present disclosure provide a signal measurement method, a measurement gap configuration method, a measurement reporting method, and a related device.

According to a first aspect, an embodiment of the present disclosure provides a signal measurement method, applied to a terminal and including:

obtaining measurement gap configuration information, where the measurement gap configuration information includes at least one of first measurement gap configuration information or second measurement gap configuration information, and gap pattern configuration information indicated by the second measurement gap configuration information is different from gap pattern configuration information indicated by the first measurement gap configuration information; and performing signal measurement within a measurement gap according to the measurement gap configuration information.

According to a second aspect, an embodiment of the present disclosure further provides a measurement gap configuration method, applied to a network device and including:

sending measurement gap configuration information to a terminal, where the measurement gap configuration information includes at least one of first measurement gap configuration information or second measurement gap configuration information, and gap pattern configuration information indicated by the second measurement gap configuration information is different from gap pattern configuration information indicated by the first measurement gap configuration information.

According to a third aspect, an embodiment of the present disclosure further provides a terminal, including:

a first obtaining module, configured to obtain measurement gap configuration information, where the measurement gap configuration information includes at least one of first measurement gap configuration information or second measurement gap configuration information, and gap pattern configuration information indicated by the second measurement gap configuration information is different from gap pattern configuration information indicated by the first measurement gap configuration information; and a first measurement module, configured to perform signal measurement within a measurement gap according to the measurement gap configuration information.

According to a fourth aspect, an embodiment of the present disclosure further provides a terminal, including a memory, a processor, and a computer program stored in the memory and executable on the processor. When the computer program is executed by the processor, the steps of the signal measurement method are implemented.

According to a fifth aspect, an embodiment of the present disclosure further provides a network device, including:

a first sending module, configured to send measurement gap configuration information to a terminal, where the measurement gap configuration information includes at least one of first measurement gap configuration information or second measurement gap configuration information, and gap pattern configuration information indicated by the second measurement gap configuration information is different from gap pattern configuration information indicated by the first measurement gap configuration information.

According to a sixth aspect, an embodiment of the present disclosure further provides a measurement reporting method, applied to a network device and including:

determining or reporting cause information of a signal measurement failure based on at least one of information about relationship information between discontinuous reception DRX states and whether sounding reference signal SRS being transmitted, DRX configuration information, or SRS configuration information.

According to a seventh aspect, an embodiment of the present disclosure further provides a measurement reporting method, applied to a location management device and including:

receiving cause information of a signal measurement failure sent by a network device; and based on the cause information of the signal measurement failure, determining a measurement failure cause or determining location request information.

According to an eighth aspect, an embodiment of the present disclosure further provides a network device, including:

a reporting module, configured to determine or report cause information of a signal measurement failure based on at least one of information about relationship information between discontinuous reception DRX states and whether sounding reference signal SRS being transmitted, DRX configuration information, or SRS configuration information.

According to a ninth aspect, an embodiment of the present disclosure further provides a location management device, including:

a fourth receiving module, configured to receive cause information of a signal measurement failure sent by a network device; and a determining module, configured to: based on the cause information of the signal measurement failure, determine a measurement failure cause or determine location request information.

According to a tenth aspect, an embodiment of the present disclosure further provides a network device, including a memory, a processor, and a computer program stored in the memory and executable on the processor. When the computer program is executed by the processor, the steps of the measurement gap configuration method or the steps of the measurement reporting method applied to the network device are implemented.

According to an eleventh aspect, an embodiment of the present disclosure further provides a location management device, including a memory, a processor, and a computer program stored in the memory and executable on the processor. When the computer program is executed by the processor, the steps of the foregoing measurement reporting method applied to the location management device are implemented.

According to a twelfth aspect, an embodiment of the present disclosure further provides a non-transitory computer-readable storage medium. The non-transitory computer-readable storage medium stores a computer program, and when the computer program is executed by a processor, the steps of the signal measurement method, the steps of the measurement gap configuration method, or the steps of the measurement reporting method are implemented.

According to a thirteenth aspect, an embodiment of the present disclosure further provides a computer program product, stored in the non-transitory computer-readable storage medium, and when the computer program product is executed by at least one processor, the steps of the signal measurement method, the steps of the measurement gap configuration method, or the steps of the measurement reporting method are implemented.

According to a fourteenth aspect, an embodiment of the present disclosure further provides a terminal, where the terminal is configured to perform the steps of the foregoing signal measurement method.

According to a fifteenth aspect, an embodiment of the present disclosure further provides a network device, where the network device is configured to perform the steps of the foregoing measurement gap configuration method or the steps of the foregoing measurement reporting method applied to the network device.

According to a sixteenth aspect, an embodiment of the present disclosure further provides a location management device, where the location management device is configured to perform the steps of the foregoing measurement reporting method applied to the location management device.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings.

FIG. 1 is a structural diagram of a network system to which the embodiments of the present disclosure are applicable;

FIG. 2 is a schematic flowchart of a signal measurement method according to an embodiment of the present disclosure;

FIG. 3 is a schematic flowchart of a measurement gap configuration method according to an embodiment of the present disclosure;

FIG. 4 is a schematic modular diagram of a terminal according to an embodiment of the present disclosure;

FIG. 7 is a first schematic flowchart of a measurement reporting method according to an embodiment of the present disclosure;

FIG. 8 is a second schematic flowchart of a measurement reporting method according to an embodiment of the present disclosure;

FIG. 9 is a second schematic modular diagram of a network device according to an embodiment of the present disclosure;

DESCRIPTION OF EMBODIMENTS

Figures 5, 6:
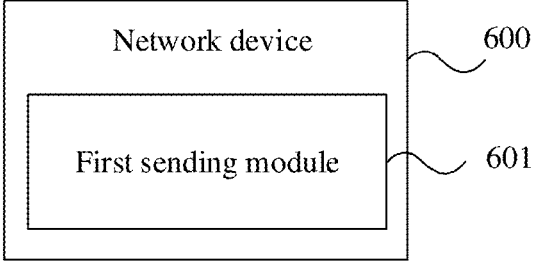
FIG. 5 is a structural block diagram of a terminal according to an embodiment of the present disclosure.
FIG. 6 is a first schematic modular diagram of a network device according to an embodiment of the present disclosure.

Exemplary embodiments of the present disclosure will be described below in more detail with reference to the accompanying drawings. Although the accompanying drawings show exemplary embodiments of the present disclosure, it should be understood that the present disclosure may be implemented in various forms and should not be limited by the embodiments described herein. Instead, these embodiments are provided so that the present disclosure will be better understood, and the scope of the present disclosure can be conveyed to those skilled in the art.

In the specification and claims of this application, the terms such as "first" and "second" are intended to distinguish between similar objects but do not necessarily indicate an order or a sequence. It should be understood that the data used in this way is interchangeable in appropriate circumstances so that the embodiments of this application described herein can be implemented in other orders than the order illustrated or described herein. Moreover, the terms "include", "have" and any other variants mean to cover the non-exclusive inclusion, for example, a process, method, system, product, or device that includes a list of steps or units is not necessarily limited to those units, but may include other units not expressly listed or inherent to such a process, method, product, or device. "And/or" in the specification and claims represents at least one of connected objects.

Examples provided in the following description are not intended to limit the scope, applicability, or configuration described in the claims. Functions and arrangements of discussed elements may be changed without departing from the spirit and scope of this disclosure. Various examples may be omitted or replaced properly, or various procedures or components may be added. For example, the described method may be performed in an order different from the described order, and steps may be added, omitted, or combined. In addition, features described with reference to some examples may be combined in other examples.

Referring to FIG. 1, FIG. 1 is a block diagram of a wireless communications system to which the embodiments of the present disclosure are applicable. The wireless communications system includes a terminal 11 and a network device 12. The terminal 11 may also be referred to as a terminal device or user terminal (UE). The terminal 11 may be a terminal-side device such as a mobile phone, a tablet computer, a laptop computer, a personal digital assistant (PDA), a mobile Internet device (MID), a wearable device, or an in-vehicle device. It should be noted that a type of the terminal 11 is not limited in the embodiments of the present disclosure. The network device 12 may be a base station or a core network. The base station may be a 5G base station and a base station of a later version (for example, a gNB or a 5G NR NB), or a base station in another communications system (for example, an eNB, a WLAN access point, or another access point). The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, or another appropriate term in the art. As long as a same technical effect is achieved, the base station is not limited to a technical term. It should be noted that in the embodiments of the present disclosure, the base station in the NR system is merely used as an example, and a type of the base station is not limited.

To make the objectives, technical solutions, and advantages of the present disclosure clearer, the following describes the present disclosure in detail with reference to the accompanying drawings and embodiments.

As shown in FIG. 2, an embodiment of the present disclosure provides a signal measurement method, applied to a terminal and including following steps.

Step 201: Obtain measurement gap configuration information, where the measurement gap configuration information includes at least one of first measurement gap configuration information or second measurement gap configuration information, and gap pattern configuration information indicated by the second measurement gap configuration information is different from gap pattern configuration information indicated by the first measurement gap configuration information.

The gap pattern configuration information includes at least one of the following:

a gap pattern identifier;

a gap length (measurement gap length); or a gap repetition period (gap period).

A plurality of pieces of gap pattern configuration information may be prescribed by a protocol. For example, the protocol defines a table, and the table contains a plurality of gap pattern configurations. For the measurement gap configuration information sent by the network device to the terminal, the network device determines content (a combination of gap length and gap repetition period) of a gap pattern based on a request of the terminal or the network device itself determines content of a gap pattern to be used by the terminal. In this embodiment of the present disclosure, different gap pattern configuration information corresponds to different gap patterns.

In this embodiment of the present disclosure, the first measurement gap configuration information includes first gap pattern configuration information. The second measure-ment gap configuration information includes second gap pattern configuration information; or the second measurement gap configuration information includes a scaling factor, and the gap pattern configuration information indicated by the second measurement gap configuration information is determined based on the first measurement gap configuration information and the scaling factor. In an embodiment of the present disclosure, the first measurement gap configuration information and the second measurement gap configuration information each may include at least one of a gap pattern identifier, a gap length, or a gap repetition period. The first measurement gap configuration information or the second measurement gap configuration information may explicitly include gap pattern configuration information, that is, directly include the gap pattern configuration information, or may include at least one of a gap length or a gap repetition period to implicitly include the gap pattern configuration information. For example, the first measurement gap configuration information may include gap pattern configuration information, where the gap pattern configuration information includes at least one of a gap length, a gap pattern identifier, or a gap repetition period (explicitly); or the first measurement gap configuration information includes a gap pattern identifier, but no gap length and gap repetition period (explicitly). For another example, the first measurement gap configuration information may include at least one of a gap length or a gap repetition period (implicitly), that is, the first measurement gap configuration information includes content (a length and a period) of the gap pattern configuration, without explicitly embodying the concept of gap pattern. In this embodiment, the gap pattern configuration information indicated by the second measurement gap configuration information may alternatively be expressed as gap pattern configuration information included in the second measurement gap configuration information, and the gap pattern configuration information indicated by the first measurement gap configuration information may alternatively be expressed as gap pattern configuration information included in the first measurement gap configuration information.

In some embodiments, the scaling factor may include a period scaling factor and/or a length scaling factor. That is, the measurement gap configuration information is further related to a period scaling factor or a length scaling factor. The period scaling factor is used to indicate a scaling multiple of a gap repetition period indicated by the first measurement gap configuration information or the second measurement gap configuration information. The length scaling factor is used to indicate a scaling multiple of a gap length indicated by the first measurement gap configuration information or the second measurement gap configuration information.

In this embodiment of the present disclosure, an extended gap length is less than or equal to a gap period, or an extended gap length is less than or equal to an extended period.

In an embodiment of the present disclosure, a value of the length scaling factor is an integer, which may be one of {2, 3, 4 . . . 10}. Using a gap length of 6 ms as an example, if the scaling factor is set to be 2, the gap length becomes 12 ms. The scaling factor may be also referred to as a repetition factor. When the scaling factor is not configured by the network side, the terminal performs measurement based on an indicated gap length. A value of the period scaling factor is an integer, which may be one of {2, 4, 8, 16, 32, 64}. Using a gap period of 160 ms as an example, if the scaling factor is set to be 2, the gap length becomes 320 ms. When the scaling factor is not configured by the network side, the terminal performs measurement based on an indicated gap period.

The measurement gap configuration information is used for measurement on positioning signals, for example, measuring a reference signal time difference (RSTD), a reference signal received power (RSRP), or the like. The measurement gap configuration information may be configured by using radio resource control (RRC) signaling. The first measurement gap configuration information and the second measurement gap configuration information each may further include a gap offset and a gap timing advance (gap TA).

In some embodiments, the gap pattern configuration information indicated by the first measurement gap configuration information may be existing gap pattern configuration information (for example, a gap pattern in TS38.133 9.1.2-1). As shown in Table 1, a value of the gap pattern identifier may be 0 to 23, a value of the gap length may be {1.5, 3, 3.5, 4, 5.5, 6}ms, and a value of the gap repetition period may be {20, 40, 80, 160}ms.

TABLE 1

| Gap pattern identifier | Gap length (ms) | Gap repetition period (ms) |
| --- | --- | --- |
| 0 | 6 | 40 |
| 1 | 6 | 80 |
| 2 | 3 | 40 |
| 3 | 3 | 80 |
| 4 | 6 | 20 |
| 5 | 6 | 160 |
| 6 | 4 | 20 |
| 7 | 4 | 40 |
| 8 | 4 | 80 |
| 9 | 4 | 160 |
| 10 | 3 | 20 |
| 11 | 3 | 160 |
| 12 | 5.5 | 20 |
| 13 | 5.5 | 40 |
| 14 | 5.5 | 80 |
| 15 | 5.5 | 160 |
| 16 | 3.5 | 20 |
| 17 | 3.5 | 40 |
| 18 | 3.5 | 80 |
| 19 | 3.5 | 160 |
| 20 | 1.5 | 20 |
| 21 | 1.5 | 40 |
| 22 | 1.5 | 80 |
| 23 | 1.5 | 160 |

The gap pattern configuration information indicated by the second measurement gap configuration information may be obtained by extending the gap pattern configuration information indicated by the first measurement gap configuration information, for example, extending a gap pattern identifier, a gap length, and/or a gap repetition period. The gap pattern configuration information indicated by the second measurement configuration information may alternatively be additional gap pattern configuration information.

Step 202: Perform signal measurement within a measurement gap according to the measurement gap configuration information.

Herein, signal measurement may be positioning signal measurement, or may be radio resource management (RRM) measurement.

In the signal measurement method in this embodiment of the present disclosure, because the gap pattern configuration information indicated by the second measurement gap configuration information is different from the gap pattern configuration information indicated by the first measurement gap configuration information, the terminal can perform measurement on positioning signals by using more gap patterns, increasing a matching degree between measurement gap configurations and positioning signal configurations. This can effectively reduce limitations imposed on positioning measurement performed by using a measurement gap.

In some embodiments, the gap pattern configuration information indicated by the first measurement gap configuration information and the gap pattern configuration information indicated by the second measurement gap configuration information satisfy at least one of the following:

a gap length indicated by the second measurement gap configuration information is greater than a gap length indicated by the first measurement gap configuration information;

a gap repetition period indicated by the second measurement gap configuration information is greater than a gap repetition period indicated by the first measurement gap configuration information; or a gap pattern identifier indicated by the second measurement gap configuration information is greater than a gap pattern identifier indicated by the first measurement gap configuration information.

In some embodiments, the gap length, the gap repetition period, or the gap pattern identifier indicated by the first or second measurement gap configuration information may be interpreted as a gap length, a gap repetition period, or a gap pattern identifier that is indicated in the gap pattern configuration information indicated by the first or second measurement gap configuration information.

In some embodiments, the gap length, the gap repetition period, or the gap pattern identifier indicated by the first measurement gap configuration information may be interpreted as a maximum gap length, a maximum gap repetition period, or a maximum gap pattern identifier indicated by the first measurement gap configuration information.

Optionally, as another manner of indicating "the gap pattern configuration information indicated by the second measurement gap configuration information is different from the gap pattern configuration information indicated by the first measurement gap configuration information", the gap pattern configuration information indicated by the first measurement gap configuration information and the gap pattern configuration information indicated by the second measurement gap configuration information may alternatively satisfy at least one of the following:

at least one of gap lengths indicated by the second measurement gap configuration information is different from a gap length indicated by the first measurement gap configuration information;

at least one of gap repetition periods indicated by the second measurement gap configuration information is different from a gap repetition period indicated by the first measurement gap configuration information; or at least one of gap pattern identifiers indicated by the second measurement gap configuration information is different from a gap pattern identifier indicated by the first measurement gap configuration information.

In some embodiments, at least one of gap pattern identifiers indicated by the second measurement gap configuration information being different from a gap pattern identifier indicated by the first measurement gap configuration information may also be interpreted as: at least one of gap pattern identifiers indicated by the second measurement gap configuration information is greater than a maximum gap pattern identifier indicated by the first measurement gap configuration information.

In an implementation, the gap pattern configuration information indicated by the first measurement gap configuration information and the gap pattern configuration information indicated by the second measurement gap configuration information satisfy at least one of the following:

a gap length indicated by the second measurement gap configuration information is greater than 6 ms;

a gap repetition period indicated by the second measurement gap configuration information is greater than 160 ms; or a gap pattern identifier indicated by the second measurement gap configuration information is greater than 23.

In this implementation, the gap pattern configuration information indicated by the second measurement gap configuration information is obtained by extending the gap pattern configuration information indicated by the first measurement gap configuration information. For example, if the gap pattern identifier is greater than 23 and the gap length is greater than 6 ms, the existing period configuration is not changed. As shown in Table 2, the gap pattern identifier indicated by the second measurement gap configuration information is 23 to 31, and a value of the gap length is {10, 14}ms, and a value of the gap repetition period is {20, 40, 80, 160}ms. Also as shown in Table 3, a value of the gap pattern identifier indicated by the second measurement gap configuration information is 23 to 31, and a value of the gap length is {10}ms, and a value of the gap repetition period is {20, 40, 80, 160, 320, 640, 1280, 2560}ms. That is, as the gap pattern identifier and gap length are extended, the existing period configuration is also changed. Optionally, the gap repetition period indicated by the second measurement gap configuration information is associated with a PRS period.

TABLE 2

| Gap pattern identifier | Gap length (ms) | Gap repetition period (ms) |
|---|---|---|
| 0 | 6 | 40 |
| 1 | 6 | 80 |
| 2 | 3 | 40 |
| 3 | 3 | 80 |
| 4 | 6 | 20 |
| 5 | 6 | 160 |
| 6 | 4 | 20 |
| 7 | 4 | 40 |
| 8 | 4 | 80 |
| 9 | 4 | 160 |
| 10 | 3 | 20 |
| 11 | 3 | 160 |
| 12 | 5.5 | 20 |
| 13 | 5.5 | 40 |
| 14 | 5.5 | 80 |
| 15 | 5.5 | 160 |
| 16 | 3.5 | 20 |
| 17 | 3.5 | 40 |
| 18 | 3.5 | 80 |
| 19 | 3.5 | 160 |
| 20 | 1.5 | 20 |
| 21 | 1.5 | 40 |
| 22 | 1.5 | 80 |
| 23 | 1.5 | 160 |
| 24 | 10 | 20 |
| 25 | 10 | 40 |
| 26 | 10 | 80 |
| 27 | 10 | 160 |
| 28 | 14 | 20 |
| 29 | 14 | 40 |
| 30 | 14 | 80 |
| 31 | 14 | 160 |

TABLE 3

| Gap pattern identifier | Gap length (ms) | Gap repetition period (ms) |
|---|---|---|
| 0 | 6 | 40 |
| 1 | 6 | 80 |
| 2 | 3 | 40 |
| 3 | 3 | 80 |
| 4 | 6 | 20 |
| 5 | 6 | 160 |
| 6 | 4 | 20 |
| 7 | 4 | 40 |
| 8 | 4 | 80 |
| 9 | 4 | 160 |
| 10 | 3 | 20 |
| 11 | 3 | 160 |
| 12 | 5.5 | 20 |
| 13 | 5.5 | 40 |
| 14 | 5.5 | 80 |
| 15 | 5.5 | 160 |
| 16 | 3.5 | 20 |
| 17 | 3.5 | 40 |
| 18 | 3.5 | 80 |
| 19 | 3.5 | 160 |
| 20 | 1.5 | 20 |
| 21 | 1.5 | 40 |
| 22 | 1.5 | 80 |
| 23 | 1.5 | 160 |
| 24 | 10 | 20 |
| 25 | 10 | 40 |
| 26 | 10 | 80 |
| 27 | 10 | 160 |
| 28 | 10 | 320 |
| 29 | 10 | 640 |
| 30 | 10 | 1280 |
| 31 | 10 | 2560 |

In addition to being obtained by extending the gap pattern configuration information indicated by the first measurement gap configuration information, the gap pattern configuration information indicated by the second measurement gap configuration information may be additional gap pattern configuration information. Optionally, the additional gap pattern configuration information is merely used for positioning measurement; optionally, the additional gap pattern configuration information is related to a UE type, for example, being used for UEs with relatively low data rate requirements. Optionally, content of the additional gap pattern configuration information is shown in Table 4.

TABLE 4

| Gap pattern identifier | Gap length (ms) | Gap repetition period (ms) |
|---|---|---|
| 0 | 10 | 80 |
| 1 | 10 | 160 |
| 2 | 10 | 320 |
| 3 | 10 | 640 |
| 4 | 10 | 1280 |
| 5 | 10 | 2560 |
| 6 | 10 | 5120 |
| 7 | 10 | 10240 |
| 8 | 14 | 160 |
| 9 | 14 | 320 |
| 10 | 14 | 640 |
| 11 | 14 | 1280 |
| 12 | 14 | 2560 |
| 13 | 14 | 5120 |
| 14 | 14 | 10240 |
| 15 | 24 | 320 |
| 16 | 24 | 640 |
| 17 | 24 | 1280 |
| 18 | 24 | 2560 |
| 19 | 24 | 5120 |
| 20 | 24 | 10240 |
| 21 | 32 | 320 |

TABLE 4-continued

| Gap pattern identifier | Gap length (ms) | Gap repetition period (ms) |
|---|---|---|
| 22 | 32 | 640 |
| 23 | 32 | 1280 |
| 24 | 32 | 2560 |
| 25 | 32 | 5120 |
| 26 | 32 | 10240 |
| 27 | 54 | 640 |
| 28 | 54 | 1280 |
| 29 | 54 | 2560 |
| 30 | 54 | 5120 |
| 31 | 54 | 10240 |
| 32 | 64 | 640 |
| 33 | 64 | 1280 |
| 34 | 64 | 2560 |
| 35 | 64 | 5120 |
| 36 | 64 | 10240 |
| 37 | 80 | 640 |
| 38 | 80 | 1280 |
| 39 | 80 | 2560 |
| 40 | 80 | 5120 |
| 41 | 80 | 10240 |

In this embodiment of the present disclosure, a gap length in the gap pattern configuration information indicated by the second measurement gap configuration information is greater than a length in the gap pattern configuration information indicated by the first measurement gap configuration information, so that the gap length of the measurement gap better matches configuration of a positioning signal configuration, which effectively resolves the problem that PRS measurement cannot be performed due to a measurement gap not long enough.

Correspondingly, the measurement gap configuration may be obtained by extending a current measurement gap configuration, as shown in a measurement gap configuration information element (MeasGapConfig information element information element):

```
MeasGapConfig information element
-- ASN1START
-- TAG-MEASGAPCONFIG-START
MeasGapConfig ::=          SEQUENCE{
gapFR2                     SetupRelease { GapConfig }
OPTIONAL, -- Need M ...,
    [[
gapFR1                     SetupRelease { GapConfig }
OPTIONAL, -- Need M
gapUE                      SetupRelease { GapConfig }
OPTIONAL -- Need M
]]
}
GapConfig ::=             SEQUENCE{
gap Offset               INTEGER (0.. 10239),
mgl                      ENUMERATED {ms1dot5, ms3, ms3dot5,
ms4, ms5dot5, ms6, ms8, ms10, ms14, ms24, ms32, ms54, ms64, ms80},
     mgrp                ENUMERATED {ms20, ms40, ms80, ms 160,
ms320, ms640, ms 1280, ms2560, ms5120, ms 10240 },
mgta               ENUMERATED {ms0, ms0dot25, ms0dot5},
...,
[[
refServCellIndicator     ENUMERATED {pCell, pSCell, mcg-FR2}
OPTIONAL   -- Cond NEDCorNRDC
]]
}
```

In the "measgapconfig" IE, "gapoffset" indicates a gap offset, "mgl" indicates a gap length, "mgrp" indicates a gap repetition period, and "mgta" indicates a gap timing advance.

The measurement gap configuration may alternatively be an additional measurement gap configuration (for example, measgapconfig-add).

In an optional implementation, the MeasGapConfig-add information element is as follows:

```
MeasGapConfig-add information element
-- ASN1START
-- TAG-MEASGAPCONFIG-START
GapConfig-add ::=         SEQUENCE{
gapOffset               INTEGER (0.. 10239),
mgl                     ENUMERATED {ms1dot5, ms3, ms3dot5,
ms4, ms5dot5, ms6, ms8, ms10, ms14, ms24, ms32, ms54, ms64, ms80},
     mgrp               ENUMERATED {ms20, ms40, ms80, ms160,
ms320, ms640, ms 1280, ms2560, ms5120, ms 10240 },
mgta               ENUMERATED {ms0, ms0dot25, ms0dot5},
...,
}
```

In another optional implementation, the MeasGapConfig-add information element is as follows:

```
MeasGapConfig-add information element
-- ASN1START
MeasGapConfig-add ::=        CHOICE {
   release                   NULL,
   setup                     SEQUENCE {
       gapOffsetadd          CHOICE {
           add0              INTEGER (0..79),
           add 1             INTEGER (0..159),
           add 2             INTEGER (0..319),
           add 3             INTEGER (0..639),
           add 4             INTEGER (0..1279),
           add 5             INTEGER (0..159),
           add 6             INTEGER (0..319),
           add 7             INTEGER (0..639),
           ...
           add N             INTEGER (0.X),
       }
       mgta                  ENUMERATED {ms0, ms0dot25, ms0dot5},
   }
}
--ASN1STOP
```

'add N' in "gapoffset add" may correspond to a gap offset of a gap pattern whose identifier (gap pattern ID) is N in the additional measurement gap pattern (additional gap pattern configuration). The number of configurable gap patterns in this implementation is consistent with the number of gap patterns in the additional measurement gap pattern given above.

Optionally, a configuration of an additional measurement gap may alternatively be a configuration dedicated to positioning measurement, such as "measgapconfig-pos". The "add" in the foregoing IE may alternatively be correspondingly modified to "pos".

In this embodiment of the present disclosure, the foregoing measurement gap pattern tables and parameters of the measurement gap pattern configuration are examples in this solution of the present disclosure. The values of parameters such as the measurement gap pattern and the gap pattern ID, gap length, gap repetition period, and gap offset in the measurement gap configuration may not be limited to the parameters provided above.

Optionally, a value of the gap length in the measurement gap pattern tables and measurement gap pattern configuration may include but is not limited to one of the following values:

{1.5, 2, 2.5, 3, 3.5, 4, 4.5, 5, 5.5, 6, 7, 8, 8.5, 9, 10, 14, 16.5, 17, 32, 33, 54, 64, 80}.

Optionally, a value of the gap repetition period in the measurement gap pattern tables and measurement gap pattern configuration may include one of the following values:
{20, 80, 160, 320, 640, 1280, 2560, 5120, 10240}.

Correspondingly, a value of the gap offset is (0 to period-1).

In another optional implementation, if a signal for measurement by using the measurement gap by the terminal is a positioning reference signal, the measurement gap configuration is further related to a positioning frequency layer. The measurement gap configuration needs to further include a positioning frequency layer identifier. For example, at least one parameter such as the gap length, period, offset, and timing advance of the measurement gap configuration may be grouped, in other words, one frequency layer identifier corresponds to a group of parameters of the measurement gap configuration.

In some embodiments, before the obtaining the measurement gap configuration information, the method further includes:

sending first request signaling; where the first request signaling is used to indicate to a network device that the terminal is to start performing signal measurement by using a measurement gap corresponding to the first measurement gap configuration information or a measurement gap corresponding to the second measurement gap configuration information.

The first request signaling includes at least one of the following:

a start parameter;

a gap pattern identifier expected by the terminal (UE expect/prefer);

a gap offset expected by the terminal;

a gap timing advance expected by the terminal;

a gap length scaling factor expected by the terminal;

a gap period scaling factor expected by the terminal;

a gap pattern type expected by the terminal; or frequency information for measurement expected by the terminal.

In some embodiments, after the performing signal measurement based on the measurement gap configuration information, the method further includes:

sending second request signaling; where the second request signaling is used to indicate to a network device that the terminal is to stop performing signal measurement by using a measurement gap corresponding to the first measurement gap configuration information or a measurement gap corresponding to the second measurement gap configuration information.

The second request signaling includes at least one of the following:

a stop parameter;

a gap pattern identifier expected by the terminal;

a gap offset expected by the terminal;

a gap timing advance (gap TA) expected by the terminal;

a gap length scaling factor expected by the terminal;

a gap period scaling factor expected by the terminal;

a gap pattern type expected by the terminal; or frequency information for measurement expected by the terminal.

The gap pattern type expected by the terminal is also equivalent to a gap type. The gap pattern type may be general gap pattern (for example, a gap pattern in TS38.133 9.1.2-1), additional gap pattern (for example, an additional gap pattern table dedicated to positioning), or on-demand gap pattern (on demand gap pattern).

If a signal for measurement is a positioning signal PRS, the frequency information for measurement may be an absolute frequency of a center frequency of a positioning frequency layer or the PRS.

Alternatively, the frequency information for measurement may be at least one of a reference point A of the positioning frequency layer, a subcarrier spacing (SCS), a starting physical resource block (PRB) position (starting PRB), or a bandwidth.

Alternatively, the frequency information for measurement is at least one of an absolute frequency of a center frequency of the positioning frequency layer or the PRS, a bandwidth expected for measurement by UE, or an SCS.

The first request signaling and the second request signaling may be carried in the RRC signaling. If the signal for measurement by the terminal is a positioning signal, the first request signaling or the second request signaling is associated with the positioning frequency layer.

In an optional implementation, in a parameter table corresponding to request signaling of the UE, at least one parameter carried in the first request signaling or the second request signaling is grouped by positioning frequency layer.

For example, one frequency layer corresponds to one group of parameters such as gap pattern ID, gap offset, gap TA, gap length/period scaling factor, and frequency information.

In another optional implementation, if the first request signaling or the second request signaling is associated with the positioning frequency layer, the first request signaling (start signaling) or the second request signaling (stop signaling) is related to the frequency layer, that is, such parameter or signaling is used for controlling start or stop of a measurement gap associated with the positioning frequency layer. If the start or stop signaling is unrelated to the frequency layer, that is, such parameter is used for starting or stopping all measurement gaps.

The following describes the request signaling with reference to embodiments.

An IE "PosMeasurementIndication" of one type of request signaling is given below, and the IE is carried by RRC signaling.

```
PosMeasurementIndication message
--ASN1START
PosDMeasurementIndication ::=              SEQUENCE {
    criticalExtensions                     CHOICE {
        c1                                 CHOICE {
            PosMeasurementIndication
    PosMeasurementIndication-IEs,
            spare3 NULL, spare2 NULL, spare1 NULL
    },
        criticalExtensionsFuture           SEQUENCE { }
    }
}

PosMeasurementIndication-IEs ::=           SEQUENCE {
    Pos-FreqIndication      CHOICE {
        start                              SEQUENCE {
            Pos-FreqInfoList               Pos-FreqInfoList
        },
        stop                               NULL
    },
        lateNonCriticalExtension           OCTET STRING
OPTIONAL,
        nonCriticalExtension               SEQUENCE { }
OPTIONAL
    }
    Pos-FreqInfoList ::=   SEQUENCE
(SIZE(1..maxpositioningfrequencylayer)) OF Pos-FreqInfo
    Pos-FreqInfo::=         SEQUENCE {
        carrierFreq                ARFCN-ValueEUTRA,
```

-continued

```
...,
    measPRS-Offset      CHOICE {
        Pos-gappattern0              INTEGER (0..79),
        Pos-gappattern 1             INTEGER (0..159),
        Pos-gappattern 2             INTEGER (0..319),
        Pos-gappattern 3             INTEGER (0..639),
        Pos-gappattern 4             INTEGER (0..1279),
        Pos-gappattern 5             INTEGER (0..159),
        Pos-gappattern 6             INTEGER (0..319),
        Pos-gappattern 7             INTEGER (0..639),
        ...
        }
    OPTIONAL
        ]]
    }
    --ASN1STOP
```

Pos-FreqInfoList may indicate a list of parameters grouped by frequency layer, in other words, these parameters are related to the positioning frequency layer. Pos-FreqInfo indicates some parameters associated with a frequency layer. For carrierFreq, one configuration is a direct configuration, namely a position of a center frequency corresponding to the positioning frequency layer; another configuration may be at least one of a point A of the positioning frequency layer, an SCS, a starting PRB, or a bandwidth; and still another configuration may be at least one of an absolute frequency of a center frequency of the positioning frequency layer or the PRS, a bandwidth for measurement expected by the UE, or an SCS. measPRS-Offset indicates a gap pattern ID and a gap offset expected by the UE.

In some embodiments, after the obtaining measurement gap configuration information or before the performing signal measurement within a measurement gap, the method further includes:

receiving trigger signaling, where the trigger signaling is used to trigger an on-demand measurement gap, and the on-demand measurement gap may also be referred to as an aperiodic measurement gap;

obtaining a start time of the on-demand measurement gap according to the trigger signaling; and based on the start time of the on-demand measurement gap, performing signal measurement by using the on-demand measurement gap.

In this case, the first measurement gap configuration information or the second measurement gap configuration information includes at least one of the following:

a gap length;

a gap timing advance;

a gap length scaling factor;

a preset time interval; or a gap pattern identifier; where the preset time interval is an offset between the start time of the on-demand measurement gap and the reception time point of the trigger signaling.

In some embodiments, the obtaining a start time of the on-demand measurement gap according to the trigger signaling includes:

obtaining the start time of the on-demand measurement gap based on a reception time point of the trigger signaling and a preset time interval; where the preset time interval is an offset between the start time of the on-demand measurement gap and the reception time point of the trigger signaling.

In some embodiments, the preset time interval includes:

a slot offset; or a slot offset and a symbol offset within slot; or an absolute time offset in units of preset time, for example, an absolute time offset in ms.

Optionally, at least one of a preset time interval, a gap pattern identifier, a gap length, a gap timing advance, or a length scaling factor may be obtained in the following manner:

(1) being prescribed in the protocol or being included in the measurement gap configuration;

(2) a plurality being prescribed in the protocol or being included in the measurement gap configuration, of which one is indicated by the trigger signaling; and (3) a plurality being prescribed in the protocol or being included in the measurement gap configuration, part of which is activated by using a MAC CE, and then one of the activated parts being indicated by DCI signaling.

In this embodiment of the present disclosure, the trigger signaling is downlink control information DCI signaling or medium access control control element MAC CE signaling.

Optionally, for signal measurement using the on-demand measurement gap, the terminal may receive only trigger signaling, with no need to receive the on-demand measurement gap configuration.

In some embodiments, before the obtaining measurement gap configuration information, before the receiving trigger signaling, or before the performing signal measurement within a measurement gap, the method further includes:

sending third request signaling; where the third request signaling is used to request an on-demand measurement gap.

The third request signaling includes at least one of the following:

a gap pattern identifier expected by the terminal;

a gap length expected by the terminal;

a gap timing advance expected by the terminal;

a gap length scaling factor expected by the terminal;

a gap pattern type expected by the terminal;

frequency information for measurement expected by the terminal; or a gap time-domain location expected by the terminal.

In an embodiment of the present disclosure, as shown in Table 5, considering aperiodicity of the on-demand measurement gap, only gap lengths in gap pattern configuration information of the on-demand measurement gap are provided in Table 5.

TABLE 5

| Gap pattern identifier | Gap length (ms) |
|---|---|
| 0 | 6 |
| 1 | 3 |
| 2 | 4 |
| 3 | 5.5 |
| 4 | 3.5 |
| 5 | 1.5 |
| 6 | 10 |
| 7 | 14 |
| 8 | 24 |
| 9 | 32 |
| 10 | 54 |
| 11 | 64 |
| 12 | 80 |

In this embodiment of the present disclosure, the on-demand measurement gap is introduced, and therefore use of measurement gaps is more flexible.

In some embodiments, the performing signal measurement based on the measurement gap configuration information includes:

within a measurement gap corresponding to the measurement gap configuration information, merely expecting to send a target signal to a network device or receive a target signal from the network device; where the target signal includes a signal for positioning measurement; or the target signal includes a signal for positioning measurement and a signal in a random access procedure; or the target signal includes a signal for positioning measurement and a signal for radio resource management RRM measurement; or the target signal includes a signal for positioning measurement, a signal in a random access procedure, and a signal for RRM measurement. Herein, the signal for positioning measurement may be a downlink positioning reference signal received from a network node.

That is, the terminal does not need to perform reception/transmission from/to the corresponding network devices except the reception of signals for RRM measurement, signals for random access procedure, and signals for positioning measurement. (UE is not required to conduct reception/transmission from/to the corresponding Network devices except the reception of signals used for RRM measurements(s), the signals used for random access procedure and the signals used for positioning measurement(s)).

The terminal behavior may be indicated by the network device, selected by the terminal, or prescribed by the protocol.

The network device may be a primary cell in an evolved UMTS terrestrial radio access network (E-UTRAN PCell), a secondary cell in an evolved UMTS terrestrial radio access network (E-UTRAN SCell(s)), an NR serving cell for E-UTRA-NR dual connectivity (NR serving cells for E-UTRA-NR dual connectivity), an NR serving cell for a stand-alone network (NR serving cells for SA (with single carrier or CA configured), a primary cell, a secondary cell, and an E-UTRAN serving cell (PCell, SCell(s) and E-UTRAN serving cells for NR-E-UTRA dual connectivity), or an NR serving cell for NR-DC (NR serving cells for NR-DC).

In some embodiments, if a gap type of the measurement gap corresponding to the measurement gap configuration information is per-frequency-range measurement gap (per-FR measurement), the network device is a network device operating in a corresponding frequency range.

In some embodiments, if the measurement gap type is per-FR measurement, the UE does not need to perform reception/transmission from/to network devices in a corresponding frequency range except the reception of signals for RRM measurement, signals for random access procedure, and signals for positioning measurement.

In some embodiments, the performing signal measurement based on the measurement gap configuration information includes:

in a case that a signal for measurement is a positioning reference signal PRS, if duration of the PRS is greater than a length of the measurement gap, and the terminal expects to perform measurement on a PRS located beyond a length of the measurement gap corresponding to the measurement gap configuration information, performing measurement on a target PRS; where the target PRS is a PRS in the PRSs that is located outside an interruption time of the measurement gap and within an activated downlink bandwidth part and whose numerology is the same as that of the activated downlink bandwidth part.

The terminal behavior may be indicated by the network device, selected by the terminal, or prescribed by the protocol.

The PRS may alternatively be interpreted as one of a PRS resource, PRS resources in a PRS resource set, consecutive PRS resources, consecutive PRS resources in a PRS resource set, and a PRS resource set.

In some embodiments, if a measurement gap is configured for the terminal, after performing signal measurement, the terminal reports a measurement result to the network device, where the measurement result further includes whether the measurement result is related to the measurement gap.

Optionally, the measurement result is associated with a PRS resource (that is, the reported measurement result is a measurement result of a PRS resource). When reporting the measurement result of the PRS resource, the terminal reports whether the measurement result is related to the measurement gap, that is, whether the terminal measures the PRS resource within the measurement gap.

Optionally, the terminal reports information about the measurement result being unrelated to the measurement gap only in a case that the measurement result is unrelated to the measurement gap. That is, when the terminal reports a measurement result of a PRS resource, if measurement on the PRS resource is not performed within the measurement gap, the terminal reports information of 'not being measured in the measurement gap or being unrelated to the measurement gap'; or if measurement on the PRS resource is performed within the measurement gap, the terminal does not report information about whether the measurement result is related to the measurement gap.

Optionally, the terminal reports information about the measurement result being related to the measurement gap only in a case that the measurement result is related to the measurement gap. That is, when the terminal reports a measurement result of a PRS resource, if measurement on the PRS resource is performed within the measurement gap, the terminal reports information of 'being measured in the measurement gap or being related to the measurement gap"; or if measurement on the PRS resource is not performed within the measurement gap, the terminal does not report information about whether the measurement result is related to the measurement gap.

Optionally, when reporting the information of 'whether the measurement result is related to the measurement gap', the terminal may also directly report which measurement results are related or unrelated to the measurement gap, that is, directly report an identifier of a measurement result related or unrelated to the measurement gap. The identifier of the measurement result is related to an identifier of the PRS resource, and the identifier of the PRS resource includes at least one of a PRS resource ID, a PRS resource set ID, or a TRP (transmission and reception point) ID.

In some embodiments, before the obtaining the measurement gap configuration information, the method further includes:

sending capability information to a network device; where the capability information includes at least one of the following:

whether a measurement gap is supported;

whether an extended measurement gap is supported; or whether an on-demand measurement gap is supported.

In other words, the capability information includes at least one of the following:

whether a measurement gap is supported; or which measurement gap or measurement gap pattern type is supported;

The measurement gap or measurement gap pattern type may include at least one of the following:

normal measurement gap (for example, gap patterns specified in TS38.133 9.1.2-1);

extended measurement gap; or on-demand measurement gap.

In the signal measurement method in this embodiment of the present disclosure, because the gap pattern configuration information indicated by the second measurement gap configuration information is different from the gap pattern configuration information indicated by the first measurement gap configuration information, the terminal can perform measurement on positioning signals by using more gap patterns, increasing a matching degree between measurement gap configurations and positioning signal configurations. This can effectively reduce limitations imposed on positioning measurement performed by using a measurement gap.

As shown in FIG. 3, an embodiment of the present disclosure further provides a measurement gap configuration method, applied to a network device and including following steps.

Step 301: Send measurement gap configuration information to a terminal, where the measurement gap configuration information includes at least one of first measurement gap configuration information or second measurement gap configuration information, and gap pattern configuration information indicated by the second measurement gap configuration information is different from gap pattern configuration information indicated by the first measurement gap configuration information.

The gap pattern configuration information includes at least one of the following:

a gap pattern identifier;

a gap length; or a gap repetition period.

A plurality of pieces of gap pattern configuration information may be prescribed by a protocol. For example, the protocol defines a table, and the table contains a plurality of gap pattern configurations. For the measurement gap configuration information sent by the network device to the terminal, the network device determines content (a combination of gap length and gap repetition period) of a gap pattern based on a request of the terminal or the network device determines itself content of a gap pattern to be used by the terminal. In this embodiment of the present disclosure, different gap pattern configuration information corresponds to different gap patterns.

In this embodiment of the present disclosure, the first measurement gap configuration information includes first gap pattern configuration information. The second measurement gap configuration information includes second gap pattern configuration information; or the second measurement gap configuration information includes a scaling factor, and the gap pattern configuration information indicated by the second measurement gap configuration information is determined based on the first measurement gap configuration information and the scaling factor. In an embodiment of the present disclosure, the first measurement gap configuration information and the second measurement gap configuration information each may include at least one of a gap pattern identifier, a gap length, or a gap repetition period. The first measurement gap configuration information or the second measurement gap configuration information may explicitly include gap pattern configuration information, that is, directly include the gap pattern configuration information, or may include at least one of a gap length or a gap repetition period to implicitly include the gap pattern configuration information. For example, the first measurement gap configuration information may include gap pattern configuration information, where the gap pattern configuration information includes at least one of a gap length, a gap pattern identifier, or a gap repetition period (explicitly); or the first measurement gap configuration information includes a gap pattern identifier, but no gap length and gap repetition period (explicitly). For another example, the first measurement gap configuration information may include at least one of a gap length or a gap repetition period (implicitly), that is, the first measurement gap configuration information includes content (a length and a period) of the gap pattern configuration, without explicitly embodying the concept of gap pattern. In this embodiment, the gap pattern configuration information indicated by the second measurement gap configuration information may alternatively be expressed as gap pattern configuration information included in the second measurement gap configuration information, and the gap pattern configuration information indicated by the first measurement gap configuration information may alternatively be expressed as gap pattern configuration information included in the first measurement gap configuration information.

In some embodiments, the scaling factor may include a period scaling factor and/or a length scaling factor. That is, the measurement gap configuration information is further related to a period scaling factor or a length scaling factor. The period scaling factor is used to indicate a scaling multiple of a gap repetition period indicated by the first measurement gap configuration information or the second measurement gap configuration information. The length scaling factor is used to indicate a scaling multiple of a gap length indicated by the first measurement gap configuration information or the second measurement gap configuration information.

In this embodiment of the present disclosure, an extended gap length is less than or equal to a gap period, or an extended gap length is less than or equal to an extended period.

The measurement gap configuration information is used for measurement on positioning signals, for example, measuring a reference signal time difference (RSTD), a reference signal received power (RSRP), or the like. The measurement gap configuration information may be configured by using radio resource control (RRC) signaling. The first measurement gap configuration information and the second measurement gap configuration information each may further include a gap offset and a gap timing advance.

In some embodiments, the gap pattern configuration information indicated by the first measurement gap configuration information may be existing gap pattern configuration information (for example, gap patterns in TS38.133 9.1.2-1), and the gap pattern configuration information indicated by the second measurement gap configuration information may be obtained by extending the gap pattern configuration information indicated by the first measurement gap configuration information, for example, by extending the gap pattern identifier, gap length, and/or gap repetition period. The gap pattern configuration information indicated by the second measurement configuration information may alternatively be additional gap pattern configuration information.

In the measurement gap configuration method in this embodiment of the present disclosure, because the gap pattern configuration information indicated by the second measurement gap configuration information is different from the gap pattern configuration information indicated by the first measurement gap configuration information, the terminal can perform measurement on positioning signals by using more gap patterns, increasing a matching degree between measurement gap configurations and positioning signal configurations. This can effectively reduce limitations imposed on positioning measurement performed by using a measurement gap.

In some embodiments, the gap pattern configuration information indicated by the first measurement gap configuration information and the gap pattern configuration information indicated by the second measurement gap configuration information satisfy at least one of the following:

a gap length indicated by the second measurement gap configuration information is greater than a gap length indicated by the first measurement gap configuration information;

a gap repetition period indicated by the second measurement gap configuration information is greater than a gap repetition period indicated by the first measurement gap configuration information; or a gap pattern identifier indicated by the second measurement gap configuration information is greater than a gap pattern identifier indicated by the first measurement gap configuration information.

In some embodiments, before the sending measurement gap configuration information to a terminal, the method further includes:

obtaining first request signaling sent by the terminal; where the first request signaling is used to indicate to the network device that the terminal is to start performing signal measurement by using a measurement gap corresponding to the first measurement gap configuration information or the second measurement gap configuration information.

The first request signaling includes at least one of the following:

a start parameter;

a gap pattern identifier expected by the terminal;

a gap offset expected by the terminal;

a gap timing advance expected by the terminal;

a gap length scaling factor expected by the terminal;

a gap period scaling factor expected by the terminal;

a gap pattern type expected by the terminal; or frequency information for measurement expected by the terminal.

In some embodiments, after the obtaining first request signaling sent by the terminal, the method further includes:

obtaining second request signaling sent by the terminal; where the second request signaling is used to indicate to the network device that the terminal is to stop performing signal measurement by using a measurement gap corresponding to the first measurement gap configuration information or the second measurement gap configuration information.

The second request signaling includes at least one of the following:

a stop parameter;

a gap pattern identifier expected by the terminal;

a gap offset expected by the terminal;

a gap timing advance expected by the terminal;

a gap length scaling factor expected by the terminal;

a gap period scaling factor expected by the terminal;

a gap pattern type expected by the terminal; or frequency information for measurement expected by the terminal.

The first request signaling and second request signaling may be carried in the RRC signaling. If the signal for measurement by the terminal is a positioning signal, the first request signaling or the second request signaling is associated with the positioning frequency layer.

In some embodiments, after the sending measurement gap configuration information to a terminal or before the terminal performs signal measurement within a measurement gap, the method further includes:

sending trigger signaling, where the trigger signaling is used to trigger an on-demand measurement gap.

Herein, the network device sends the trigger signaling, and the terminal obtains a start time of the on-demand measurement gap based on the trigger signaling, and performs signal measurement by using the on-demand measurement gap based on the start time of the on-demand measurement gap.

In this case, the first measurement gap configuration information or the second measurement gap configuration information includes at least one of the following:

a gap length;

a gap timing advance;

a gap length scaling factor;

a preset time interval; or a gap pattern identifier; where the preset time interval is an offset between the start time of the on-demand measurement gap and the reception time point of the trigger signaling.

In some embodiments, before the sending trigger signaling, the method further includes:

receiving third request signaling sent by the terminal; where the third request signaling is used to request an on-demand measurement gap.

The third request signaling includes at least one of the following:

a gap pattern identifier expected by the terminal;

a gap length expected by the terminal;

a gap timing advance expected by the terminal;

a gap length scaling factor expected by the terminal;

a gap pattern type expected by the terminal;

frequency information for measurement expected by the terminal; or a gap time-domain location expected by the terminal.

In this embodiment of the present disclosure, the on-demand measurement gap is introduced, and therefore use of measurement gaps is more flexible.

In some embodiments, before the sending measurement gap configuration information to a terminal, the method further includes:

receiving capability information sent by the terminal; where the capability information includes at least one of the following:

whether a measurement gap is supported;

whether an extended measurement gap is supported; or whether an on-demand measurement gap is supported.

In other words, the capability information includes at least one of the following:

whether a measurement gap is supported; or which measurement gap or measurement gap pattern type is supported;

The measurement gap or measurement gap pattern type may include at least one of the following:

normal measurement gap (for example, gap patterns specified in TS38.133 9.1.2-1);

extended measurement gap; or on-demand measurement gap.

In the measurement gap configuration method in this embodiment of the present disclosure, because the gap pattern configuration information indicated by the second measurement gap configuration information is different from the gap pattern configuration information indicated by the first measurement gap configuration information, the terminal can perform measurement on positioning signals by using more gap patterns, increasing a matching degree between measurement gap configurations and positioning signal configurations. This can effectively reduce limitations imposed on positioning measurement performed by using a measurement gap.

As shown in FIG. 4, an embodiment of the present disclosure provides a terminal 400, including:

a first obtaining module 401, configured to obtain measurement gap configuration information, where the measurement gap configuration information includes at least one of first measurement gap configuration information or second measurement gap configuration information, and gap pattern configuration information indicated by the second measurement gap configuration information is different from gap pattern configuration information indicated by the first measurement gap configuration information; and a first measurement module 402, configured to perform signal measurement within a measurement gap according to the measurement gap configuration information.

For the terminal in this embodiment of the present disclosure, the gap pattern configuration information includes at least one of the following:

a gap pattern identifier;

a gap length; or a gap repetition period.

For the terminal in this embodiment of the present disclosure, the gap pattern configuration information indicated by the first measurement gap configuration information and the gap pattern configuration information indicated by the second measurement gap configuration information satisfy at least one of the following:

a gap length indicated by the second measurement gap configuration information is greater than a gap length indicated by the first measurement gap configuration information;

a gap repetition period indicated by the second measurement gap configuration information is greater than a gap repetition period indicated by the first measurement gap configuration information; or a gap pattern identifier indicated by the second measurement gap configuration information is greater than a gap pattern identifier indicated by the first measurement gap configuration information.

The terminal in this embodiment of the present disclosure further includes:

a second sending module, configured to send first request signaling before the first obtaining module obtains the measurement gap configuration information.

The first request signaling is used to indicate to a network device that the terminal is to start performing signal measurement by using a measurement gap corresponding to the first measurement gap configuration information or a measurement gap corresponding to the second measurement gap configuration information.

For the terminal in this embodiment of the present disclosure, the first request signaling includes at least one of the following:

a start parameter;

a gap pattern identifier expected by the terminal;

a gap offset expected by the terminal;

a gap timing advance expected by the terminal;

a gap length scaling factor expected by the terminal;

a gap period scaling factor expected by the terminal;

a gap pattern type expected by the terminal; or frequency information for measurement expected by the terminal.

For the terminal in this embodiment of the present disclosure, if a signal for measurement by the terminal is a positioning signal, the first request signaling is associated with a positioning frequency layer.

The terminal in this embodiment of the present disclosure further includes:

a third sending module, configured to send second request signaling after the first measurement module performs signal measurement based on the measurement gap configuration information.

The second request signaling is used to indicate to a network device that the terminal is to stop performing signal measurement by using a measurement gap corresponding to the first measurement gap configuration information or a measurement gap corresponding to the second measurement gap configuration information.

For the terminal in this embodiment of the present disclosure, the second request signaling includes at least one of the following:

a stop parameter;

a gap pattern identifier expected by the terminal;

a gap offset expected by the terminal;

a gap timing advance expected by the terminal;

a gap length scaling factor expected by the terminal;

a gap period scaling factor expected by the terminal;

a gap pattern type expected by the terminal; or frequency information for measurement expected by the terminal.

For the terminal in this embodiment of the present disclosure, if a signal for measurement by the terminal is a positioning signal, the second request signaling is associated with a positioning frequency layer.

The terminal in this embodiment of the present disclosure further includes:

a first receiving module, configured to receive trigger signaling after the first obtaining module obtains the measurement gap configuration information or before the first measurement module performs signal measurement, where the trigger signaling is used to trigger an on-demand measurement gap;

a second obtaining module, configured to obtain a start time of the on-demand measurement gap according to the trigger signaling; and a second measurement module, configured to: based on the start time of the on-demand measurement gap, perform signal measurement by using the on-demand measurement gap.

For the terminal in this embodiment of the present disclosure, the second obtaining module is configured to obtain the start time of the on-demand measurement gap based on a reception time of the trigger signaling and a preset time interval.

The preset time interval is an offset between the start time of the on-demand measurement gap and the reception time point of the trigger signaling.

For the terminal in this embodiment of the present disclosure, the preset time interval includes:

a slot offset; or a slot offset and a symbol offset within slot; or an absolute time offset in units of preset time.

For the terminal in this embodiment of the present disclosure, the trigger signaling is downlink control information DCI signaling or medium access control control element MAC CE signaling.

The terminal in this embodiment of the present disclosure further includes:

a fourth sending module, configured to send third request signaling before the first obtaining module obtains the measurement gap configuration information, or before the first receiving module receives the trigger signaling, or before the first measuring module performs signal measurement.

The third request signaling is used to request an on-demand measurement gap.

For the terminal in this embodiment of the present disclosure, the third request signaling includes at least one of the following:

a gap pattern identifier expected by the terminal;

a gap length expected by the terminal;

a gap timing advance expected by the terminal;

a gap length scaling factor expected by the terminal;

a gap pattern type expected by the terminal;

frequency information for measurement expected by the terminal; or a gap time-domain location expected by the terminal.

For the terminal in this embodiment of the present disclosure, the first measurement module is configured to: within a measurement gap corresponding to the measurement gap configuration information, merely expect to send a target signal to a network device or receive a target signal from the network device.

The target signal includes a signal for positioning measurement; or the target signal includes a signal for positioning measurement and a signal in a random access procedure; or the target signal includes a signal for positioning measurement and a signal for radio resource management RRM measurement; or the target signal includes a signal for positioning measurement, a signal in a random access procedure, and a signal for RRM measurement.

For the terminal in this embodiment of the present disclosure, if a gap type of the measurement gap corresponding to the measurement gap configuration information is per-frequency-range measurement gap, the network device is a network device operating in a corresponding frequency range.

For the terminal in this embodiment of the present disclosure, the first measurement module is configured to: perform measurement on a target PRS in a case that a signal for measurement is a positioning reference signal PRS, if duration of the PRS is greater than a length of the measurement gap, and the terminal expects to perform measurement on a PRS located beyond a length of the measurement gap corresponding to the measurement gap configuration information.

The target PRS is a PRS in the PRSs that is located outside an interruption time of the measurement gap and within an activated downlink bandwidth part and whose numerology is the same as that of the activated downlink bandwidth part.

The terminal in this embodiment of the present disclosure further includes:

a fifth sending module, configured to send capability information to the network device before the first obtaining module obtains the measurement gap configuration information.

The capability information includes at least one of the following:

whether a measurement gap is supported;

whether an extended measurement gap is supported; or whether an on-demand measurement gap is supported.

According to the terminal in this embodiment of the present disclosure, because the gap pattern configuration information indicated by the second measurement gap configuration information is different from the gap pattern configuration information indicated by the first measurement gap configuration information, the terminal can perform measurement on positioning signals by using more gap patterns, increasing a matching degree between measurement gap configurations and positioning signal configurations. This can effectively reduce limitations imposed on positioning measurement performed by using a measurement gap.

It should be noted that the terminal embodiment is a terminal corresponding to the foregoing signal measurement method applied to the terminal. All the implementations of the foregoing embodiment are applicable to the terminal embodiment, with the same technical effects achieved.

FIG. 5 is a schematic diagram of a hardware structure of a terminal for implementing the embodiments of the present disclosure.

The terminal 50 includes but is not limited to components such as a radio frequency unit 510, a network module 520, an audio output unit 530, an input unit 540, a sensor 550, a display unit 560, a user input unit 570, an interface unit 580, a memory 590, a processor 511, and a power supply 512. A person skilled in the art may understand that the structure of the terminal shown in FIG. 5 does not constitute any limitation on the terminal device. The terminal may include more or fewer components than those shown in the figure, or a combination of some components, or the components disposed differently. In this embodiment of the present disclosure, the terminal includes, but is not limited to, a mobile phone, a tablet computer, a laptop computer, a personal digital assistant, an in-vehicle terminal, a wearable device, a pedometer, and the like.

The processor 511 is configured to obtain measurement gap configuration information, where the measurement gap configuration information includes at least one of first measurement gap configuration information or second measurement gap configuration information, and gap pattern configuration information indicated by the second measurement gap configuration information is different from gap pattern configuration information indicated by the first measurement gap configuration information; and performing signal measurement within a measurement gap according to the measurement gap configuration information.

According to the terminal in this embodiment of the present disclosure, because the gap pattern configuration information indicated by the second measurement gap configuration information is different from the gap pattern configuration information indicated by the first measurement gap configuration information, the terminal can perform measurement on positioning signals by using more gap patterns, increasing a matching degree between gap pattern configurations and positioning signal configurations. This can effectively reduce limitations imposed on positioning measurement performed by using a measurement gap.

The terminal in this embodiment of the present disclosure is capable of implementing all implementations in the embodiment of the signal measurement method applied to the terminal, with the same effects achieved. Details are not repeated herein.

It should be understood that in this embodiment of the present disclosure, the radio frequency unit 510 may be configured to receive and send information, or to receive and send a signal in a call process, and specially, after receiving downlink data from a network-side device, send the downlink data to the processor 511 for processing; and also send uplink data to the network-side device. Generally, the radio frequency unit 510 includes but is not limited to an antenna, at least one amplifier, a transceiver, a coupler, a low noise amplifier, a duplexer, and the like. In addition, the radio frequency unit 510 may also communicate with a network and other devices via a wireless communications system.

The terminal provides a user with wireless broadband internet access through the network module 520, for example, helping the user to send and receive e-mails, browse web pages, and access streaming media.

The audio output unit 530 may convert audio data received by the radio frequency unit 510 or the network module 520 or stored in the memory 590 into an audio signal and output the audio signal as a sound. In some embodiments, the audio output unit 530 may also provide audio output (for example, a call signal received sound or a message received sound) related to a function performed by the terminal 50. The audio output unit 530 includes a speaker, a buzzer, a receiver, and the like.

The input unit 540 is configured to receive an audio or video signal. The input unit 540 may include a graphics processing unit (GPU) 541 and a microphone 542. The graphics processing unit 541 processes image data of a still picture or a video obtained by an image capture apparatus (for example, a camera) in an image capture mode or a video capture mode. A processed image frame may be displayed on the display unit 560. The image frame processed by the graphics processing unit 541 may be stored in the memory 590 (or another storage medium) or be transmitted by the radio frequency unit 510 or the network module 520. The microphone 542 is capable of receiving sounds and processing such sounds into audio data. The processed audio data can be converted into a format output that can be sent to a mobile communication network device through the radio frequency unit 510 in a telephone call mode.

The terminal 50 further includes at least one sensor 550, for example, an optical sensor, a motion sensor, and other sensors. The optical sensor may include an ambient light sensor and a proximity sensor. The ambient light sensor may adjust luminance of the display panel 561 based on brightness of ambient light, and the proximity sensor may turn off the display panel 561 and/or backlight when the terminal 50 moves close to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the terminal, functions related to vibration recognition (such as pedometer and tapping), and the like. The sensor 550 may also include a fingerprint sensor, a pressure sensor, an iris sensor, a molecular sensor, a gyroscope, a barometer, a hygrometer, a thermometer, an infrared sensor, and the like. Details are not described herein.

The display unit 560 is configured to display information input by the user or information provided to the user. The display unit 560 may include a display panel 561, and the display panel 561 may be configured in a form of a liquid crystal display (LCD), an organic light-emitting diode (OLED), or the like.

The user input unit 570 may be configured to: receive a digit or character information that is input, and generate signal input related to user settings and function control of the terminal. The user input unit 570 may include a touch panel 571 and other input devices 572. The touch panel 571 is also referred to as a touchscreen and can collect a touch operation (such as an operation performed by the user on the touch panel 571 or near the touch panel 571 with a finger or by using any proper object or accessory such as a stylus) of the user on or near the touch panel 571. The touch panel 571 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and transmits the touchpoint coordinates to the processor 511, and can receive a command transmitted by the processor 511 and execute the command. In addition, the touch panel 571 may be implemented in a plurality of forms, for example, as a resistive, capacitive, infrared, or surface acoustic wave touch panel. The user input unit 570 may include the other input devices 572 in addition to the touch panel 571. The other input devices 572 may include but are not limited to a physical keyboard, a function key (such as a volume control key or an on/off key), a trackball, a mouse, and a joystick. Details are not described herein.

Optionally, the touch panel 571 may cover the display panel 561. When detecting a touch operation on or near the touch panel 571, the touch panel 571 transmits the touch operation to the processor 511 to determine a type of a touch event. Then, the processor 511 provides a corresponding visual output on the display panel 561 based on the type of the touch event. In FIG. 5, the touch panel 571 and the display panel 561 serve as two independent components to implement input and output functions of the terminal. In some embodiments, however, the touch panel 571 may be integrated with the display panel 561 to implement the input and output functions of the terminal. This is not specifically limited herein.

The interface unit 580 is an interface between an external apparatus and the terminal 50. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 580 may be configured to: receive input (for example, data information and power) from the external apparatus, and transmit the received input to one or more elements in the terminal 50, or may be configured to transmit data between the terminal 50 and the external apparatus.

The memory 590 may be configured to store software programs and various data. The memory 590 may mainly include a program storage area and a data storage area. The program storage area may store an operating system, and an application program required by at least one function (for example, a sound playback function or an image playback function). The data storage area may store data (for example, audio data or a phone book) created according to use of the mobile phone. In addition, the memory 590 may include a high-speed random access memory, and may further include a non-volatile memory such as at least one disk storage device, a flash memory device, or another volatile solid-state storage device.

The processor 511 is a control center of the terminal, and is connected to all components of the terminal by using various interfaces and lines. By running or executing a software program and/or module that is stored in the memory 590 and calling data stored in the memory 590, the processor 511 executes various functions of the terminal and processes data, so as to perform overall monitoring on the terminal. The processor 511 may include one or more processing units. The processor 511 may integrate an application processor and a modem processor. The application processor mainly processes the operating system, a user interface, an application program, and the like. The modem processor mainly processes wireless communication. It can be understood that the modem processor may alternatively be not integrated in the processor 511.

The terminal 50 may further include the power supply 512 (such as a battery) supplying power to each component. The power supply 512 may be logically connected to the processor 511 by using a power management system, so that functions such as charge and discharge management and power consumption management are implemented by using the power management system.

In addition, the terminal 50 includes some functional modules that are not illustrated. Details are not described herein.

Optionally, an embodiment of the present disclosure further provides a terminal, including a memory, a processor, and a computer program stored in the memory and executable on the processor. When the computer program is executed by the processor, the processes of the foregoing embodiment of the signal measurement method applied to the terminal side can be implemented, with the same technical effects achieved. To avoid repetition, details are not described herein again.

An embodiment of the present disclosure further provides a non-transitory computer-readable storage medium, where a computer program is stored in the non-transitory computer-readable storage medium. When the computer program is executed by a processor, the processes of the foregoing embodiment of the signal measurement method applied to the terminal side can be implemented, with the same technical effects achieved. To avoid repetition, details are not described herein again. The non-transitory computer-readable storage medium is, for example, a read-only memory (ROM), a random access memory (RAM), a magnetic disk, or an optical disc.

As shown in FIG. 6, an embodiment of the present disclosure provides a network device 600, including:

a first sending module 601, configured to send measurement gap configuration information to a terminal, where the measurement gap configuration information includes at least one of first measurement gap configuration information or second measurement gap configuration information, and gap pattern configuration information indicated by the second measurement gap configuration information is different from gap pattern configuration information indicated by the first measurement gap configuration information.

For the network device in this embodiment of the present disclosure, the gap pattern configuration information includes at least one of the following:

a gap pattern identifier;

a gap length; or a gap repetition period.

For the network device in this embodiment of the present disclosure, the gap pattern configuration information indicated by the first measurement gap configuration information and the gap pattern configuration information indicated by the second measurement gap configuration information satisfy at least one of the following:

a gap length indicated by the second measurement gap configuration information is greater than a gap length indicated by the first measurement gap configuration information;

a gap repetition period indicated by the second measurement gap configuration information is greater than a gap repetition period indicated by the first measurement gap configuration information; or a gap pattern identifier indicated by the second measurement gap configuration information is greater than a gap pattern identifier indicated by the first measurement gap configuration information.

The network device in this embodiment of the present disclosure includes:

a third obtaining module, configured to: before the first sending module sends the measurement gap configuration information to the terminal, obtain first request signaling sent by the terminal.

The first request signaling is used to indicate to the network device that the terminal is to start performing signal measurement by using a measurement gap corresponding to the first measurement gap configuration information or the second measurement gap configuration information.

For the network device in this embodiment of the present disclosure, the first request signaling includes at least one of the following:

a start parameter;

a gap pattern identifier expected by the terminal;

a gap offset expected by the terminal;

a gap timing advance expected by the terminal;

a gap length scaling factor expected by the terminal;

a gap period scaling factor expected by the terminal;

a gap pattern type expected by the terminal; or frequency information for measurement expected by the terminal.

For the network device in this embodiment of the present disclosure, if a signal for measurement by the terminal is a positioning signal, the first request signaling is associated with a positioning frequency layer.

The network device in this embodiment of the present disclosure includes:

a fourth obtaining module, configured to: after the third obtaining module obtains the first request signaling sent by the terminal, obtain second request signaling sent by the terminal.

The second request signaling is used to indicate to the network device that the terminal is to stop performing signal measurement by using a measurement gap corresponding to the first measurement gap configuration information or the second measurement gap configuration information.

For the network device in this embodiment of the present disclosure, the second request signaling includes at least one of the following:

a stop parameter;

a gap pattern identifier expected by the terminal;

a gap offset expected by the terminal;

a gap timing advance expected by the terminal;

a gap length scaling factor expected by the terminal;

a gap period scaling factor expected by the terminal;

a gap pattern type expected by the terminal; or frequency information for measurement expected by the terminal.

For the network device in this embodiment of the present disclosure, if a signal for measurement by the terminal is a positioning signal, the second request signaling is associated with a positioning frequency layer.

The network device in this embodiment of the present disclosure includes:

a sixth sending module, configured to send trigger signaling after the first sending module sends the measurement gap configuration information to the terminal or before the terminal performs measurement within the measurement gap, where the trigger signaling is used to trigger an on-demand measurement gap.

For the network device in this embodiment of the present disclosure, the first measurement gap configuration information or the second measurement gap configuration information includes at least one of the following:

a gap length;

a gap timing advance;

a gap length scaling factor;

a preset time interval; or a gap pattern identifier.

The preset time interval is an offset between the start time of the on-demand measurement gap and the reception time point of the trigger signaling.

The network device in this embodiment of the present disclosure includes:

a second receiving module, configured to: before the sixth sending module sends the trigger signaling, receive third request signaling sent by the terminal.

The third request signaling is used to request an on-demand measurement gap.

For the network device in this embodiment of the present disclosure, the third request signaling includes at least one of the following:

a gap pattern identifier expected by the terminal;

a gap length expected by the terminal;

a gap timing advance expected by the terminal;

a gap length scaling factor expected by the terminal;

a gap pattern type expected by the terminal;

frequency information for measurement expected by the terminal; or a gap time-domain location expected by the terminal.

The network device in this embodiment of the present disclosure includes:

a third receiving module, configured to: before the first sending module sends the measurement gap configuration information to the terminal, receive capability information sent by the terminal.

The capability information includes at least one of the following:

whether a measurement gap is supported;

whether an extended measurement gap is supported; or whether an on-demand measurement gap is supported.

According to the network device in this embodiment of the present disclosure, because the gap pattern configuration information indicated by the second measurement gap configuration information is different from the gap pattern configuration information indicated by the first measurement gap configuration information, the terminal can perform measurement on positioning signals by using more gap patterns, increasing a matching degree between measurement gap configurations and positioning signal configurations. This can effectively reduce limitations imposed on positioning measurement performed by using a measurement gap.

It should be noted that the embodiment of the network device is a network device corresponding to the foregoing measurement gap configuration method applied to the network device. All the implementations of the foregoing embodiment are applicable to the embodiment of the network device, with the same technical effects achieved.

In some other embodiments of the present disclosure, a reporting method is further provided to resolve the problem of uplink positioning resource allocation.

In the related art, in uplink positioning, the location management device lacks sufficient auxiliary information of an aspect (for example the measurement failure cause information provided by the network device), and the location management device cannot properly recommend or determine allocation of uplink positioning resources (such as SRSs for positioning).

Based on this, as shown in FIG. 7, an embodiment of the present disclosure further provides a measurement reporting method, applied to a network device. The network device may be a serving gNB or a neighboring gNB, or a serving cell or a neighboring cell. The method includes:

Step 701: Determine or report cause information of a signal measurement failure based on at least one of information about relationship information between discontinuous reception DRX states and whether sounding reference signal SRS being transmitted, DRX configuration information, or SRS configuration information.

In this embodiment of the present disclosure, a discontinuous reception (DRX) cycle is formed by "On Duration" and "Opportunity for DRX". In an "On Duration" time, UE monitors and receives a physical downlink control channel (PDCCH) (that is, a DRX active time, which may be also referred to as an active period). In an "Opportunity for DRX" time, the UE does not receive data of a downlink channel to reduce power consumption (that is, a DRX non-active time, which may be also referred to as a dormant period).

The information about a relationship between discontinuous reception DRX states and sounding reference signal SRS transmission includes: sending the SRS only in a DRX active time, or sending the SRS in a DRX inactive time.

In an embodiment of the present disclosure, the SRS for positioning is sent only in the DRX active time, or the SRS for positioning is sent in the DRX inactive time (non-Active Time).

The sending the SRS for positioning only in the DRX active time means not sending the SRS for positioning in the DRX non-active time.

However, the sending an SRS for positioning in a DRX non-active time may include: sending the SRS for positioning only in the DRX non-active time, or sending the SRS for positioning in both the DRX non-active time and the DRX active time.

In this embodiment of the present disclosure, optionally, the sending the SRS only in the DRX non-active time includes: if a transmit time window of the SRS partially overlaps a time window of the DRX active time, cancelling sending the SRS in an overlapping portion.

In some embodiments of the present disclosure, whether to send or not to send the SRS in the DRX non-active time and/or how to send the SRS may be determined by the network device, and then indicated to the terminal.

In some other embodiments of the present disclosure, whether to send or not to send the SRS in the DRX non-active time and/or how to send the SRS may be determined by the terminal.

Certainly, whether to send or not to send the SRS in the DRX non-active time and/or how to send the SRS may alternatively be prescribed by a protocol.

This embodiment of the present disclosure clarifies behaviors in a case of measurement failure or no signal measurement and transmission resulting from DRX configuration.

In this embodiment of the present disclosure, optionally, the SRS includes at least one of the following: an aperiodic SRS, a periodic SRS, or a semi-static SRS.

Optionally, the aperiodic SRS, the periodic SRS, and the semi-static SRS may have different behaviors. For example, for the aperiodic SRS, the SRS for positioning is sent in the DRX active time and the DRX non-active time.

In some embodiments, the reporting cause information of a signal measurement failure includes:

sending the cause information of the signal measurement failure to a location management device.

In this embodiment of the present disclosure, the location management device may be located in a core network, for example, the location management device may be a location management function (LMF or E-SLMC), or the like. The location management device may alternatively be located in an access network.

In this embodiment of the present disclosure, optionally, the cause information of the signal measurement failure is sent to the location management device by using an LTE positioning protocol (LPPA), an evolved NRPPA, or other evolved protocols.

The following provides descriptions by using examples.

In some embodiments of the present disclosure, before the present disclosure, the location management device obtains the following information: a current period of the SRS and the DRX configuration information.

In the foregoing embodiment, optionally, the current period of the SRS is determined based on a function of a configuration period of the SRS and/or a function of the DRX cycle. For example, the current period of the SRS is increased along with the DRX configuration.

For example, the function includes one of the following: Max(A,B); and lowest common multiple (A,B); where A is a value determined based on the function of the configuration period of the SRS, and B is a value determined based on the function of the DRX cycle.

The value determined based on the function of the configuration period of the SRS may also include the configuration period of the SRS itself. The value determined based on the function of the DRX cycle may also include the DRX cycle itself.

In the foregoing embodiments, optionally, the current period of the SRS is one of the following:

T2 in a case that DRX has been configured;

T3 in a case that the DRX cycle has changed or the DRX becomes long DRX; and

T1 in a case that the DRX configuration has been cancelled; where

T1, T2, and T3 are different from each other.

In the foregoing embodiments, optionally, the DRX configuration information includes at least one of the following: a DRX cycle, configuration information of a DRX duration timer, configuration information of a DRX inactivity timer, configuration information of a DRX downlink retransmission timer, configuration information of a DRX uplink retransmission timer, configuration information of a DRX long-cycle start offset timer, configuration information of a DRX short cycle, configuration information of a DRX short-cycle timer, configuration information of a DRX downlink HARQ round-trip transmission time timer, configuration information of a DRX uplink HARQ round-trip transmission time timer, or configuration information of a DRX command MAC CE.

The following describes the DRX timers.

DRX onDuration timer (drx-onDurationTimer): indicates duration of monitoring a PDCCH by the UE in one DRX cycle. Once started, restart midway is not allowed.

DRX inactivity timer (drx-InactivityTimer): indicates duration of monitoring a PDCCH after a PDCCH indicating new transmission is received. The timer starts or restarts at the first symbol after the PDCCH indicating new transmission (UL or DL) is received. The timer stops when a DRX command MAC CE is received.

DRX downlink retransmission timing/DRX uplink retransmission timer (drx-RetransmissionTimerDL/drx-RetransmissionTimerUL): This timer is a per HARQ Process parameter, indicating the maximum number of PDCCH slots (slot) for which the UE needs to continuously perform monitoring for receiving expected downlink retransmission data. The timer starts at the first symbol after the drx-HARQ-RTT-Timer expires. The timer stops when a PDCCH indicating downlink retransmission is received.

DRX long cycle start offset timer (drx-LongCycleStartOffset): may indicate two meanings: longDRX-Cycle and drxStartOffset. If a short cycle (ShortDrx-Cycle) parameter is also configured on the network side, a long cycle needs to be configured to be an integer multiple of a short cycle.

DRX short cycle (drx-ShortCycle): indicates a cycle length of the short DRX-cycle.

DRX short cycle timer (drx-ShortCycleTimer): indicates entering the long cycle after no PDCCH is received for how many short cycles. The timer starts when the drx-inactivityTimer expires and a short cycle is configured. A length of the timer is an integer multiple of the short cycle.

DRX downlink HARQ round-trip transmission time timer/DRX uplink HARQ round-trip transmission time timer (drx-HARQ-RTT-TimerDL/drx-HARQ-RTT-TimerUL): This timer is a Per HARQ Process parameter, indicating a minimum time interval for waiting for retransmission. This timer starts at the first symbol after ACK/NACK transmission ends. During running of the timer, a corresponding MAC does not monitor the PDCCH. When the timer expires, the drx-RetransmissionTimerDL corresponding to a HARQ process starts.

The (long) DRX command MAC CE ((Long) DRX Command MAC CE) is introduced to make the UE enter a sleeping state as quickly as possible. Long CE may be used to stop the drx-ShortCycleTimer and enter the long DRX; and the CE is used to stop the drx-InactivityTimer, to enter short cycle DRX if the short cycle DRX is configured, or enter long cycle DRX if the short cycle DRX is not configured. In some embodiments, before or after the determining or reporting cause information of the signal measurement failure, the method further includes:

receiving location request information sent by the location management device, where the location request information is used to cancel, reconfigure, or re-request measurement of the signal by the network device; and/or receiving a location request sent by the location management device, where the location request includes a measurement period or a reporting period, and the measurement period or the reporting period is a current period of the SRS or a period determined by the location management device.

The cause information of the signal measurement failure includes at least one of the following:

measurement error or failure indication information;

indication information of no signal measurement;

indication information of insufficient signal measurement;

being immeasurable due to DRX configuration;

indication information of no signal measurement performed due to DRX configuration; or indication information of insufficient signal measurement performed due to DRX configuration.

The cause information of the signal measurement failure is sent to the location management device by using the LPPA, NRPPa, or evolved versions thereof. In some embodiments, the cause information of the signal measurement failure may be included in the following content, and listed in the enumerated information. In a case that a measurement failure is caused by the foregoing corresponding cause, the cause information is reported.

Details are shown in Table 6.

TABLE 6

| IE/Group name | Presence | Range | IE type and reference | Semantics description |
|---|---|---|---|---|
| CHOICE Cause Group >Radio Network Layer | M | | | |
| >>Radio Network Layer Cause | M | | Enumerated (ENUMERATED) (Unspecified, Requested Item not Supported (Requested Item not Supported), Requested Item Temporarily not Available (Requested Item Temporarily not Available), Indication of Measurement Error or Failure, Indication of No Signal Measurement, Indication of Insufficient Signal Measurement, Inability to Measure due to DRX Configuration, Indication of No Signal Measurement due to DRX Configuration, Indication of Insufficient Signal Measurement due to DRX Configuration, . . . ) | |

In the measurement reporting method in this embodiment of the present disclosure, in uplink positioning, the network device reports the cause information of the measurement failure to the location management device, and the location management device can more properly recommend or determine allocation of uplink positioning resources (for example, the SRS for positioning). This reduces unnecessary waste of uplink resources and improves use efficiency of uplink resources.

As shown in FIG. 8, an embodiment of the present disclosure further provides a measurement reporting method, applied to a location management device and including following steps.

Step 801: Receive cause information of a signal measurement failure sent by a network device.

In this embodiment of the present disclosure, the location management device may be located in a core network, for example, the location management device may be a location management function (LMF or E-SLMC), or the like. The location management device may alternatively be located in an access network.

The cause information of the signal measurement failure includes at least one of the following:

measurement error or failure indication information;

indication information of no signal measurement;

indication information of insufficient signal measurement;

being immeasurable due to DRX configuration;

indication information of no signal measurement performed due to DRX configuration; or indication information of insufficient signal measurement performed due to DRX configuration.

Step 802: Based on the cause information of the signal measurement failure, determine a measurement failure cause or determine location request information.

In some embodiments, the method further includes:

sending the location request information to the network device, where the location request information is used to cancel, reconfigure, or re-request measurement of the signal by the network device;

and/or sending a location request to the network device, where the location request includes a measurement period or a reporting period, and the measurement period or the reporting period is a current period of the SRS or a period determined by the location management device.

In this embodiment of the present disclosure, when the location server receives target information (including at least one of the following: DRX configuration information, SRS configuration information, information about the relationship between DRX states and SRS transmission, or cause information of signal measurement failure), measurement on the SRS or location request information for a serving cell or a neighboring cell may be cancelled, or measurement on the SRS or location request information for a serving cell or a neighboring cell may be reconfigured or updated.

In some embodiments, the location request information is sent to the neighboring cell or serving cell, where the location request information is used to cancel, reconfigure, or re-request signal measurement in the neighboring cell or serving cell;

and/or the location request information is sent to the neighboring cell or serving cell, where the location request information includes a measurement period or a reporting period, and the measurement period or the reporting period is a current period of the SRS or a period determined by the location management device.

In the measurement reporting method in this embodiment of the present disclosure, in uplink positioning, the network device reports the cause information of the measurement failure to the location management device, and the location management device can more properly recommend or determine allocation of uplink positioning resources (for example, the SRS for positioning). This reduces unnecessary waste of uplink resources and improves use efficiency of uplink resources.

As shown in FIG. 9, an embodiment of the present disclosure further provides a network device 900, including:

a reporting module 901, configured to determine or report cause information of a signal measurement failure based on at least one of information about relationship information between discontinuous reception DRX states and whether sounding reference signal SRS being transmitted, DRX configuration information, or SRS configuration information.

For the network device in this embodiment of the present disclosure, the cause information of the signal measurement failure includes at least one of the following:

measurement error or failure indication information;

indication information of no signal measurement;

indication information of insufficient signal measurement;

being immeasurable due to DRX configuration;

indication information of no signal measurement performed due to DRX configuration; or indication information of insufficient signal measurement performed due to DRX configuration.

In the network device in this embodiment of the present disclosure, the reporting module is configured to send the cause information of the signal measurement failure to a location management device.

The network device in this embodiment of the present disclosure further includes:

a fifth receiving module, configured to: before or after the reporting module determines or reports the cause information of the signal measurement failure, receive the location request information sent by the location management device, where the location request information is used to cancel, reconfigure or re-request measurement of the signal by the network device;

and/or receive a location request sent by the location management device, where the location request includes a measurement period or a reporting period, and the measurement period or the reporting period is a current period of the SRS or a period determined by the location management device.

The network device in this embodiment of the present disclosure reports the cause information of the measurement failure to the location management device, and the location management device can more properly recommend or determine allocation of uplink positioning resources (for example, the SRS for positioning). This reduces unnecessary waste of uplink resources and improves use efficiency of uplink resources.

Figure 10:
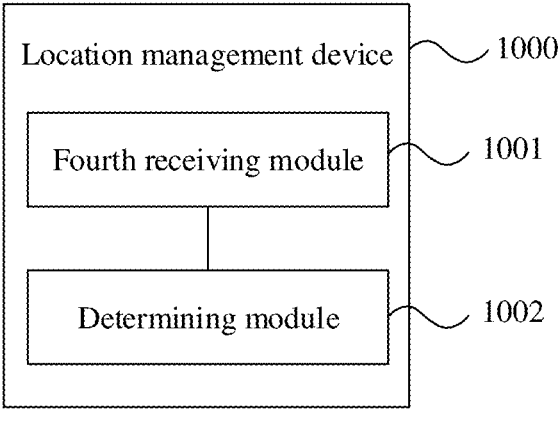
FIG. 10 is a schematic modular diagram of a location management device according to an embodiment of the present disclosure.

As shown in FIG. 10, an embodiment of the present disclosure further provides a location management device 1000, including:

a fourth receiving module 1001, configured to receive cause information of a signal measurement failure sent by a network device; and a determining module 1002, configured to: based on the cause information of the signal measurement failure, determine a measurement failure cause or determine location request information.

The location management device in this embodiment of the present disclosure further includes:

a seventh sending module, configured to send the location request information to the network device, where the location request information is used to cancel, reconfigure, or re-request measurement of the signal by the network device;

and/or send a location request to the network device, where the location request includes a measurement period or a reporting period, and the measurement period or the reporting period is a current period of the SRS or a period determined by the location management device.

The location management device in this embodiment of the present disclosure obtains the cause information of the measurement failure reported by the network device, and the location management device can more properly recommend or determine allocation of uplink positioning resources (for example, the SRS for positioning) based on the cause information of the measurement failure. This reduces unnecessary waste of uplink resources and improves use efficiency of uplink resources.

Figure 11:
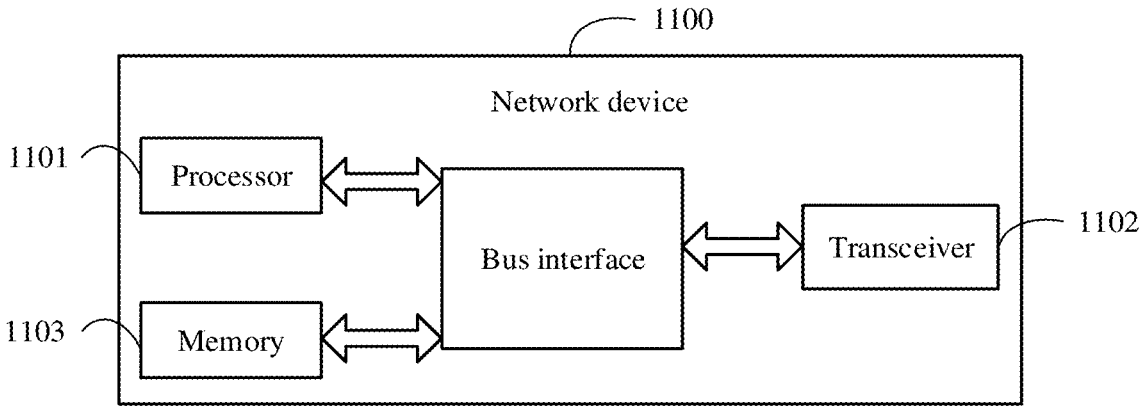
FIG. 11 is a structural block diagram of a network device according to an embodiment of the present disclosure.

FIG. 11 is a structural diagram of a network device according to an embodiment of the present disclosure, and the network device is capable of implementing details of the measurement gap configuration method or the measurement reporting method described above, with the same effects achieved. As shown in FIG. 11, the network device 1100 includes a processor 1101, a transceiver 1102, a memory 1103, and a bus interface. The processor 1101 is configured to:

send measurement gap configuration information to a terminal by using the transceiver 1102, where the measurement gap configuration information includes at least one of first measurement gap configuration information or second measurement gap configuration information, and gap pattern configuration information indicated by the second measurement gap configuration information is different from gap pattern configuration information indicated by the first measurement gap configuration information.

In FIG. 11, a bus architecture may include any quantity of interconnected buses and bridges, for interconnecting various circuits of one or more processors represented by the processor 1101 and a memory represented by the memory 1103. The bus architecture may further interconnect various other circuits such as a peripheral device, a voltage regulator, and a power management circuit. These are all well known in the art, and therefore are not further described in this specification. The bus interface provides an interface. The transceiver 1102 may be a plurality of components, that is, the transceiver 1102 includes a transmitter and a receiver, and provides a unit for communicating with various other apparatuses on a transmission medium.

Alternatively, the processor 1101 is configured to determine or report cause information of a signal measurement failure based on at least one of information whether there is a relationship between discontinuous reception DRX states and sounding reference signal SRS transmission, DRX configuration information, or SRS configuration information.

The network device in this embodiment of the present disclosure can implement the processes of the embodiment of the measurement gap configuration method applied to the network device or the processes of the embodiment of the measurement reporting method applied to the network device, with the same technical effects achieved. To avoid repetition, details are not described herein again.

An embodiment of the present disclosure further provides a network device, including a processor, a memory, and a computer program stored in the memory and executable on the processor. When the computer program is executed by the processor, the processes of the foregoing measurement gap configuration method embodiment applied to the network device are implemented, or the processes of the foregoing measurement reporting method embodiment applied to the network device are implemented, with the same technical effects achieved. To avoid repetition, details are not described herein again.

An embodiment of the present disclosure further provides a location management device, including a memory, a processor, and a computer program stored in the memory and executable on the processor. When the computer program is executed by the processor, the steps of the foregoing measurement reporting method embodiment applied to the location management device are implemented.

An embodiment of the present disclosure further provides a non-transitory computer-readable storage medium, where a computer program is stored in the non-transitory computer-readable storage medium. When the computer program is executed by a processor, the processes of the foregoing measurement gap configuration method embodiment applied to the network device are implemented or the processes of the foregoing measurement reporting method embodiment applied to the location management device are implemented, with the same technical effects achieved. To avoid repetition, details are not described herein again. The non-transitory computer-readable storage medium is, for example, a read-only memory (ROM), a random access memory (RAM), a magnetic disk, or an optical disc.

The network-side device may be a base transceiver station (BTS) in a Global System for Mobile Communications (GSM) or Code Division Multiple Access (CDMA), or may be a NodeB (NB) in Wideband Code Division Multiple Access (WCDMA), or may be an evolved NodeB (eNB or eNodeB), a relay station, or an access point in LTE, or may be a base station in a future 5G network, or the like, and is not limited herein.

According to the description of the foregoing implementations, persons skilled in the art can clearly understand that the method in the foregoing embodiments may be implemented by software in addition to a necessary universal hardware platform or by hardware only. In most cases, the former is a more preferred implementation. Based on such an understanding, the technical solutions of the present disclosure essentially, or the part contributing to the related art, may be implemented in a form of a software product. The software product is stored in a storage medium (such as a ROM/RAM, a magnetic disk, or an optical disc), and includes several instructions for instructing an electronic device (which may be a mobile phone, a computer, a server, an air conditioner, a network device, or the like) to perform the methods described in the embodiments of the present disclosure.

The foregoing descriptions are preferred implementations of the present disclosure. It should be noted that a person of ordinary skill in the art may make several improvements or refinements without departing from the principle of the present disclosure and the improvements or refinements shall fall within the protection scope of the present disclosure.

What is claimed is:

1. A signal measurement method, comprising:
obtaining, by a terminal, measurement gap configuration information via a radio resource control (RRC) signaling, wherein the measurement gap configuration information is used for measurement on positioning signals, the measurement gap configuration information comprises first measurement gap configuration information and second measurement gap configuration information, and gap pattern configuration information indicated by the second measurement gap configuration information is different from gap pattern configuration information indicated by the first measurement gap configuration information;
receiving, by the terminal, trigger signaling via a medium access control control element (MAC CE) signaling, wherein the trigger signaling is used to trigger an on-demand measurement gap, and configuration information of the on-demand measurement gap is one of a plurality of the first measurement gap configuration information or a plurality of the second measurement gap configuration information;
in a case that a signal for measurement is a positioning reference signal (PRS), if duration of the PRS is greater than a length of the on-demand measurement gap and the terminal expects to perform measurement on a PRS located beyond a length of the on-demand measurement gap corresponding to the measurement gap configuration information, performing, by the terminal, measurement on a target PRS which is located outside an interruption time of the on-demand measurement gap and within an activated downlink bandwidth part and has a numerology that is the same as that of the activated downlink bandwidth part; and
reporting, by the terminal, a measurement result to a network device;
wherein:
the measurement result comprises an identifier used to indicate whether the measurement result is related to the on-demand measurement gap;
in a case that a measurement on a PRS resource is performed within the on-demand measurement gap, the identifier indicates that the measurement result reported by the terminal is related to the on-demand measurement gap;
in a case that the measurement on the PRS resource is not performed within the on-demand measurement gap, the identifier indicates that the measurement result reported by the terminal is unrelated to the on-demand measurement gap;
the gap pattern configuration information comprises at least one of a gap length or a gap repetition period;
a gap length indicated by the second measurement gap configuration information is greater than a gap length indicated by the first measurement gap configuration information; and
when the gap length indicated by the second measurement gap configuration information is 10 ms, the gap repetition period indicated by the second measurement gap configuration information is 80 ms.

2. The method according to claim 1, wherein the gap pattern configuration information indicated by the second measurement gap configuration information is obtained by extending the gap pattern configuration information indicated by the first measurement gap configuration information.

3. The method according to claim 1, wherein the gap pattern configuration information further comprises:
a gap pattern identifier; and
the gap pattern configuration information indicated by the first measurement gap configuration information and the gap pattern configuration information indicated by the second measurement gap configuration information satisfy at least one of:
a gap repetition period indicated by the second measurement gap configuration information is greater than a gap repetition period indicated by the first measurement gap configuration information; or
a gap pattern identifier indicated by the second measurement gap configuration information is greater than a gap pattern identifier indicated by the first measurement gap configuration information.

4. The method according to claim 1, wherein before the obtaining, by a terminal, measurement gap configuration information via a radio resource control (RRC) signaling, the method further comprises:

sending first request signaling; wherein:

the first request signaling is used to indicate to a network device that the terminal is to start performing signal measurement by using a measurement gap corresponding to the first measurement gap configuration information or a measurement gap corresponding to the second measurement gap configuration information; and the first request signaling comprises at least one of:

a start parameter;

a gap pattern identifier expected by the terminal;

a gap offset expected by the terminal;

a gap timing advance expected by the terminal;

a gap length scaling factor expected by the terminal;

a gap period scaling factor expected by the terminal;

a gap pattern type expected by the terminal; or frequency information for measurement expected by the terminal, wherein the frequency information for measurement comprises at least one of a reference point A of a positioning frequency layer, a subcarrier spacing, a starting physical resource block (PRB) position, or a bandwidth.

5. The method according to claim 1, wherein before the obtaining measurement gap configuration information, the method further comprises:

sending capability information to a network device; wherein the capability information comprises at least one of following:

whether a measurement gap is supported;

whether an extended measurement gap is supported; or whether an on-demand measurement gap is supported.

6. The method according to claim 1, after the obtaining, by a terminal, measurement gap configuration information via a radio resource control (RRC) signaling, the method further comprises:

obtaining, by the terminal a start time of the on-demand measurement gap according to the trigger signaling; and performing, by the terminal signal measurement by using the on-demand measurement gap, based on the start time of the on-demand measurement gap.

7. The method according to claim 6, wherein the obtaining the start time of the on-demand measurement gap according to the trigger signaling comprises:

obtaining the start time of the on-demand measurement gap based on a reception time point of the trigger signaling and a preset time interval; wherein:

the preset time interval is an offset between the start time of the on-demand measurement gap and the reception time point of the trigger signaling.

8. The method according to claim 7, wherein the preset time interval comprises:

a slot offset; or a slot offset and a symbol offset within slot; or an absolute time offset in units of preset time.

9. The method according to claim 6, wherein before the obtaining the measurement gap configuration information, or before the receiving the trigger signaling, the method further comprises:

sending third request signaling;

wherein:

the third request signaling is used to request an on-demand measurement gap; and the third request signaling comprises at least one of:

a gap pattern identifier expected by the terminal;

a gap length expected by the terminal;

a gap timing advance expected by the terminal;

a gap length scaling factor expected by the terminal;

a gap pattern type expected by the terminal;

frequency information for measurement expected by the terminal; or a gap time-domain location expected by the terminal.

10. A terminal, comprising a memory, a processor, and a computer program stored in the memory and executable on the processor, wherein the computer program, when executed by the processor, cause the terminal to perform:

obtaining measurement gap configuration information via a radio resource control (RRC) signaling, wherein the measurement gap configuration information is used for measurement on positioning signals, the measurement gap configuration information comprises first measurement gap configuration information and second measurement gap configuration information, and gap pattern configuration information indicated by the second measurement gap configuration information is different from gap pattern configuration information indicated by the first measurement gap configuration information;

receiving, by the terminal, trigger signaling via a medium access control control element (MAC CE) signaling, wherein the trigger signaling is used to trigger an on-demand measurement gap, and configuration information of the on-demand measurement gap is one of a plurality of the first measurement gap configuration information or a plurality of the second measurement gap configuration information;

in a case that a signal for measurement is a positioning reference signal (PRS), if duration of the PRS is greater than a length of the measurement gap and the terminal expects to perform measurement on a PRS located beyond a length of the measurement gap corresponding to the measurement gap configuration information, performing measurement on a target PRS, the target PRS being located outside an interruption time of the measurement gap and within an activated downlink bandwidth part and having a numerology that is the same as that of the activated downlink bandwidth part; and reporting a measurement result to a network device; wherein:

the measurement result comprises an identifier used to indicate whether the measurement result is related to the on-demand measurement gap;

in a case that a measurement on a PRS resource is performed within the on-demand measurement gap, the identifier indicates that the measurement result reported by the terminal is related to the on-demand measurement gap;

in a case that the measurement on the PRS resource is not performed within the on-demand measurement gap, the identifier indicates that the measurement result reported by the terminal is unrelated to the on-demand measurement gap;

the gap pattern configuration information comprises at least one of a gap length or a gap repetition period;

a gap length indicated by the second measurement gap configuration information is greater than a gap length indicated by the first measurement gap configuration information; and when the gap length indicated by the second measurement gap configuration information is 10 ms, the gap repetition period indicated by the second measurement gap configuration information is 80 ms.

* * * * *